US007556203B2

(12) United States Patent
Robinson et al.

(10) Patent No.: US 7,556,203 B2
(45) Date of Patent: Jul. 7, 2009

(54) METHOD AND SYSTEM FOR LINKING A WIRELESS HAND HELD OPTICAL READER WITH A BASE UNIT OR OTHER WIRELESS DEVICE

(75) Inventors: Michael D. Robinson, Weedsport, NY (US); John Izzo, Auburn, NY (US); Joseph Livingston, Camillus, NY (US); Clayton Roberts, Tully, NY (US); Joseph A. Walczyk, Syracuse, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 511 days.

(21) Appl. No.: 11/168,230

(22) Filed: Jun. 27, 2005

(65) Prior Publication Data

US 2006/0289654 A1  Dec. 28, 2006

(51) Int. Cl.
  *G06K 7/10*  (2006.01)
(52) U.S. Cl. .............................. 235/462.45; 235/472.01
(58) Field of Classification Search ............ 235/462.45, 235/462.46, 472.01, 472.02, 472.03
See application file for complete search history.

(56) References Cited

U.S. PATENT DOCUMENTS

| 3,826,900 A | 7/1974 | Moellering |
| 4,251,798 A | 2/1981 | Swartz et al. |
| 4,369,361 A | 1/1983 | Swartz et al. |
| 4,387,297 A | 6/1983 | Swartz et al. |
| 4,409,470 A | 10/1983 | Shepard et al. |

(Continued)

FOREIGN PATENT DOCUMENTS

GB   2 324 634 A   10/1998

(Continued)

OTHER PUBLICATIONS

Hand Held Products Imageteam 2020/4620 Area Imager Cordless System, System Manual, 4620-SM Rev. A , Jan. 2005—220 pages.

(Continued)

*Primary Examiner*—Karl D. Frech
(74) *Attorney, Agent, or Firm*—Marjama Muldoon Blasiak & Sullivan LLP

(57) ABSTRACT

A retail store network comprising a cash register, server, and hand held optical reader for reading a bar code symbol of an item and generating a decoded out bar code data message. The hand held bar code reader has an electrical connector and a wireless transceiver. The optical reader can be used with a base unit also having an electrical connector and a wireless transceiver. The network is configured so that the hand held bar code reader and the base unit have one linking mode in which the address of the base unit is sent to the hand held bar code reader through their respective electrical connectors. The linking process is completed by way of wireless communication, including the transmission of the address of the hand held bar code reader to the base unit. The hand held bar code reader further comprises circuitry to allow the optical reader to also operate in a linking mode where it can link with other devices that it cannot physically mate its electrical connector with, but can initiate the linking and complete the process wirelessly.

25 Claims, 14 Drawing Sheets

U.S. PATENT DOCUMENTS

| | | |
|---|---|---|
| 4,523,139 A | 6/1985 | Schwarz et al. |
| 4,760,428 A | 7/1988 | Watanabe et al. |
| 4,850,009 A | 7/1989 | Zook et al. |
| 4,896,026 A | 1/1990 | Krichever et al. |
| 4,922,178 A | 5/1990 | Matuszewski et al. |
| 5,015,833 A | 5/1991 | Shepard et al. |
| 5,019,699 A | 5/1991 | Koenck |
| 5,052,943 A | 10/1991 | Davis |
| 5,059,778 A | 10/1991 | Zouzoulas et al. |
| 5,059,779 A | 10/1991 | Krichever et al. |
| 5,065,003 A | 11/1991 | Wakatsuki et al. |
| 5,124,539 A | 6/1992 | Krichever et al. |
| 5,132,523 A | 7/1992 | Bassett |
| 5,155,346 A | 10/1992 | Doing et al. |
| 5,189,291 A | 2/1993 | Siemiatkowski |
| 5,195,183 A | 3/1993 | Miller et al. |
| 5,198,650 A | 3/1993 | Wike, Jr. |
| 5,216,233 A | 6/1993 | Main et al. |
| 5,262,627 A | 11/1993 | Shepard |
| 5,313,053 A | 5/1994 | Koenck et al. |
| 5,317,691 A | 5/1994 | Traeger |
| 5,321,246 A | 6/1994 | Shepard et al. |
| 5,331,580 A | 7/1994 | Miller et al. |
| 5,406,063 A | 4/1995 | Jelen |
| 5,408,081 A | 4/1995 | Barkan |
| 5,408,382 A | 4/1995 | Schultz et al. |
| 5,459,389 A | 10/1995 | Fujiwara et al. |
| 5,466,170 A | 11/1995 | Pavek |
| 5,468,948 A | 11/1995 | Koenck et al. |
| 5,473,242 A | 12/1995 | McKenna |
| 5,475,206 A | 12/1995 | Reddersen et al. |
| 5,484,992 A | 1/1996 | Wilz et al. |
| 5,496,992 A | 3/1996 | Madan et al. |
| 5,504,316 A | 4/1996 | Bridgelall et al. |
| 5,521,370 A | 5/1996 | Hanson |
| 5,525,789 A | 6/1996 | Rockstein et al. |
| 5,544,010 A | 8/1996 | Schultz et al. |
| 5,557,093 A | 9/1996 | Knowles et al. |
| 5,591,953 A | 1/1997 | Rockstein et al. |
| 5,616,908 A | 4/1997 | Wilz et al. |
| 5,625,180 A | 4/1997 | Hanson et al. |
| 5,644,471 A | 7/1997 | Schultz et al. |
| 5,661,292 A | 8/1997 | Knowles et al. |
| 5,665,956 A | 9/1997 | La et al. |
| 5,694,318 A | 12/1997 | Miller et al. |
| 5,715,156 A | 2/1998 | Yilmaz et al. |
| 5,734,253 A | 3/1998 | Brake et al. |
| 5,767,501 A | 6/1998 | Schmidt et al. |
| 5,786,585 A | 7/1998 | Eastman et al. |
| 5,796,091 A | 8/1998 | Schmidt et al. |
| 5,808,285 A | 9/1998 | Rockstein et al. |
| 5,841,121 A | 11/1998 | Koenck |
| 5,844,227 A | 12/1998 | Schmidt et al. |
| 5,847,545 A | 12/1998 | Chen et al. |
| 5,861,615 A | 1/1999 | Bridgelall et al. |
| 5,874,722 A | 2/1999 | Rando et al. |
| 5,878,395 A | 3/1999 | Bennett |
| 5,883,375 A | 3/1999 | Knowles et al. |
| 5,888,087 A | 3/1999 | Hanson et al. |
| 5,889,268 A | 3/1999 | Swartz |
| 5,895,431 A | 4/1999 | Miller et al. |
| 5,928,292 A | 7/1999 | Miller et al. |
| 5,939,701 A | 8/1999 | Rockstein et al. |
| 5,942,743 A | 8/1999 | Schmidt et al. |
| 5,945,660 A | 8/1999 | Nakasuji et al. |
| 5,961,337 A | 10/1999 | Kordes |
| 5,978,569 A | 11/1999 | Traeger |
| 5,979,757 A * | 11/1999 | Tracy et al. ................. 235/383 |
| 5,992,747 A | 11/1999 | Katoh et al. |
| 6,000,619 A | 12/1999 | Reddersen et al. |
| 6,002,236 A | 12/1999 | Trant et al. |
| 6,002,946 A | 12/1999 | Reber et al. |
| 6,015,091 A | 1/2000 | Rockstein et al. |
| 6,042,414 A | 3/2000 | Kunert |
| 6,045,048 A | 4/2000 | Wilz, Sr. et al. |
| 6,053,413 A | 4/2000 | Swift et al. |
| 6,053,759 A | 4/2000 | Kunert |
| 6,065,676 A | 5/2000 | Ring et al. |
| 6,094,029 A | 7/2000 | Reynolds et al. |
| 6,104,162 A | 8/2000 | Sainsbury et al. |
| 6,123,265 A | 9/2000 | Schlieffers et al. |
| 6,134,125 A | 10/2000 | Wenzel |
| 6,137,260 A | 10/2000 | Wung et al. |
| 6,138,914 A | 10/2000 | Campo et al. |
| 6,149,063 A | 11/2000 | Reynolds et al. |
| 6,182,898 B1 | 2/2001 | Schmidt et al. |
| 6,193,161 B1 | 2/2001 | Sojka et al. |
| 6,216,951 B1 | 4/2001 | Swift et al. |
| 6,216,953 B1 | 4/2001 | Kumagai et al. |
| 6,236,486 B1 | 5/2001 | Nocker, IV |
| 6,244,510 B1 | 6/2001 | Ring et al. |
| 6,249,008 B1 | 6/2001 | Bunte et al. |
| 6,257,492 B1 | 7/2001 | Bressler et al. |
| 6,283,375 B1 | 9/2001 | Wilz, Sr. et al. |
| 6,286,760 B1 | 9/2001 | Schmidt et al. |
| 6,290,132 B1 | 9/2001 | Dickson et al. |
| 6,299,067 B1 | 10/2001 | Schmidt et al. |
| 6,321,991 B1 | 11/2001 | Knowles |
| 6,328,215 B1 | 12/2001 | Dickson et al. |
| 6,338,434 B1 | 1/2002 | Wilz, Sr. et al. |
| 6,345,764 B1 | 2/2002 | Knowles |
| 6,375,074 B1 | 4/2002 | Dickson et al. |
| 6,375,078 B1 | 4/2002 | Russell et al. |
| 6,394,354 B1 | 5/2002 | Wilz, Sr. et al. |
| 6,410,931 B1 | 6/2002 | Dvorkis et al. |
| 6,412,699 B1 | 7/2002 | Russell et al. |
| 6,415,980 B1 | 7/2002 | Dickson et al. |
| 6,418,325 B1 | 7/2002 | Reber et al. |
| 6,422,466 B1 | 7/2002 | Dickson et al. |
| 6,439,462 B1 | 8/2002 | Dickson et al. |
| 6,453,173 B1 | 9/2002 | Reber et al. |
| 6,457,646 B1 | 10/2002 | Dickson et al. |
| 6,460,769 B1 | 10/2002 | Knowles et al. |
| 6,483,273 B1 | 11/2002 | Lee |
| 6,484,943 B1 | 11/2002 | Reber et al. |
| 6,510,997 B1 | 1/2003 | Wilz, Sr. et al. |
| 6,517,001 B1 | 2/2003 | Knowles et al. |
| 6,523,750 B1 | 2/2003 | Dickson et al. |
| 6,530,522 B1 | 3/2003 | Check et al. |
| 6,547,144 B1 | 4/2003 | Dickson et al. |
| 6,556,553 B1 | 4/2003 | Palmer et al. |
| 6,561,424 B1 | 5/2003 | Dickson et al. |
| 6,568,595 B1 | 5/2003 | Russell et al. |
| 6,575,368 B1 | 6/2003 | Tamburrini et al. |
| 6,581,837 B1 | 6/2003 | Hattersley |
| 6,595,420 B1 | 7/2003 | Wilz, Sr. et al. |
| 6,604,684 B1 | 8/2003 | Schmidt et al. |
| 6,607,134 B1 | 8/2003 | Bard et al. |
| 6,616,047 B2 | 9/2003 | Catan |
| 6,619,549 B2 | 9/2003 | Zhu et al. |
| 6,622,917 B1 | 9/2003 | Knowles |
| 6,641,046 B2 | 11/2003 | Durbin |
| 6,643,158 B2 | 11/2003 | McDonald et al. |
| 6,644,549 B1 | 11/2003 | Swartz |
| 6,650,560 B2 | 11/2003 | MacDonald et al. |
| 6,675,203 B1 | 1/2004 | Herrod et al. |
| 6,681,994 B1 | 1/2004 | Koenck |
| 6,688,523 B1 | 2/2004 | Koenck |
| 6,732,933 B2 | 5/2004 | Waxelbaum |
| 6,758,402 B1 | 7/2004 | Check et al. |
| 6,764,012 B2 | 7/2004 | Connolly et al. |
| 6,772,949 B2 | 8/2004 | Wilz, Sr. et al. |
| 6,783,071 B2 | 8/2004 | Levine et al. |
| 6,811,088 B2 | 11/2004 | Lanzaro et al. |

| | | | |
|---|---|---|---|
| 6,814,293 B2 | 11/2004 | Curry et al. | |
| 6,837,436 B2 | 1/2005 | Swartz et al. | |
| 6,860,427 B1 | 3/2005 | Schmidt et al. | |
| 6,886,104 B1 | 4/2005 | McClurg et al. | |
| 2002/0017566 A1 | 2/2002 | Knolwes | |
| 2002/0023960 A1 | 2/2002 | Knowles et al. | |
| 2002/0050524 A1 | 5/2002 | Dickson et al. | |
| 2002/0050525 A1 | 5/2002 | Dickson et al. | |
| 2002/0100804 A1 | 8/2002 | Byun et al. | |
| 2002/0153422 A1 | 10/2002 | Tsikos et al. | |
| 2002/0162892 A1 | 11/2002 | Koenck et al. | |
| 2002/0185542 A1 | 12/2002 | Wilz, Sr. et al. | |
| 2003/0019938 A1 | 1/2003 | Byun et al. | |
| 2003/0024990 A1 | 2/2003 | Wilz et al. | |
| 2003/0034399 A1 | 2/2003 | Wilz, Sr. et al. | |
| 2003/0042313 A1 | 3/2003 | Kahn et al. | |
| 2003/0178492 A1 | 9/2003 | Tamburrini et al. | |
| 2003/0209605 A1 | 11/2003 | Walczyk et al. | |
| 2003/0222146 A1 | 12/2003 | Schmidt et al. | |
| 2003/0222150 A1 | 12/2003 | Sato et al. | |
| 2003/0226896 A1 | 12/2003 | Dickson et al. | |
| 2004/0169084 A1 | 9/2004 | Tamburrini et al. | |
| 2005/0040230 A1 | 2/2005 | Swartz et al. | |
| 2005/0150959 A1 | 7/2005 | Izzo et al. | |

FOREIGN PATENT DOCUMENTS

| | | |
|---|---|---|
| GB | 2 345 370 A | 7/2000 |
| JP | 2000515655 A | 11/2000 |
| WO | WO 94/27247 A1 | 11/1994 |
| WO | WO 97/28512 A1 | 8/1997 |

OTHER PUBLICATIONS

Hand Held Products Imageteam 2020/4620 Area Imager Cordless System, System Manual, 4620B-SM Rev. A , Apr. 2005—248 pages.
Hand Held Products Imageteam 2020/5620 Cordless System, System Manual, 5620-Sm Rev. A, Oct. 2004—168 pages.
Hand Held Products Imageteam 2020/5620 Cordless System, System Manual, 5620B-SM Rev. A, Apr. 2005—180 pages.

\* cited by examiner

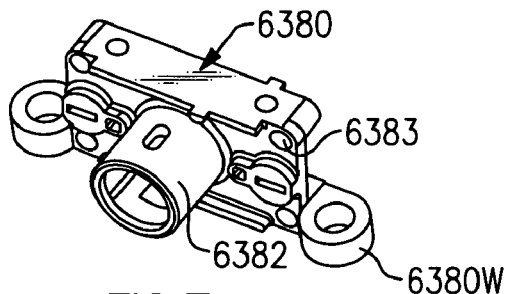
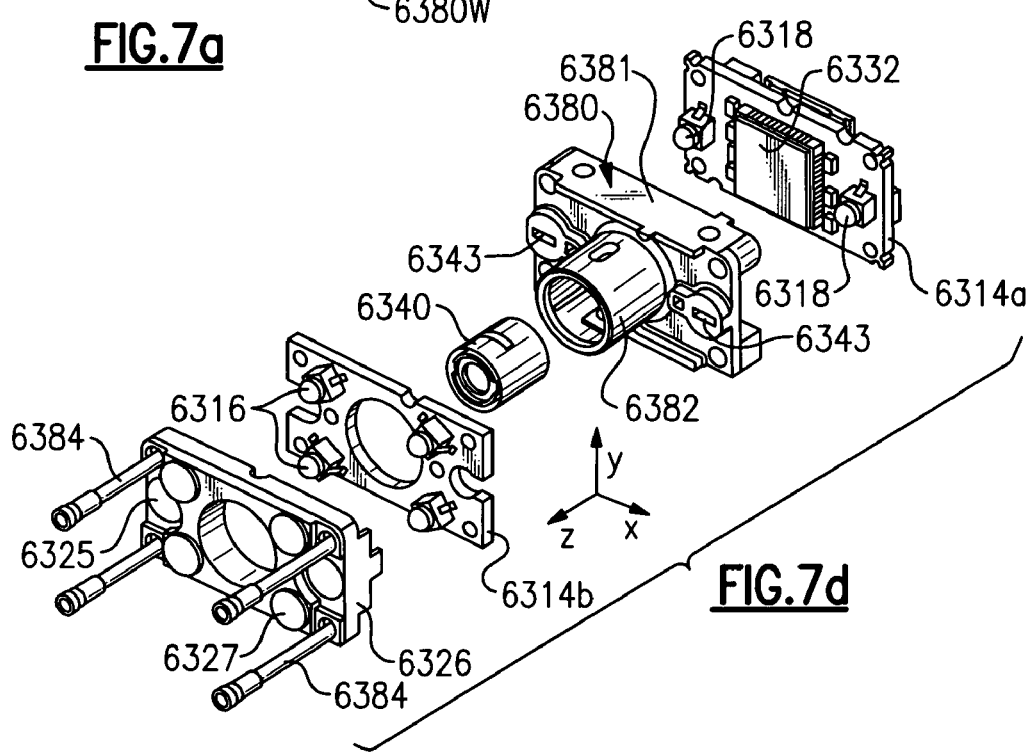
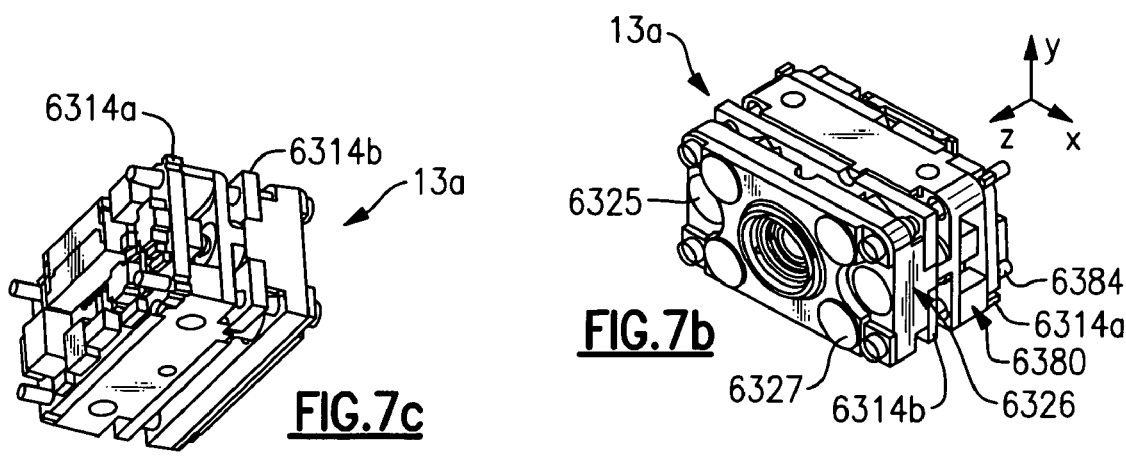

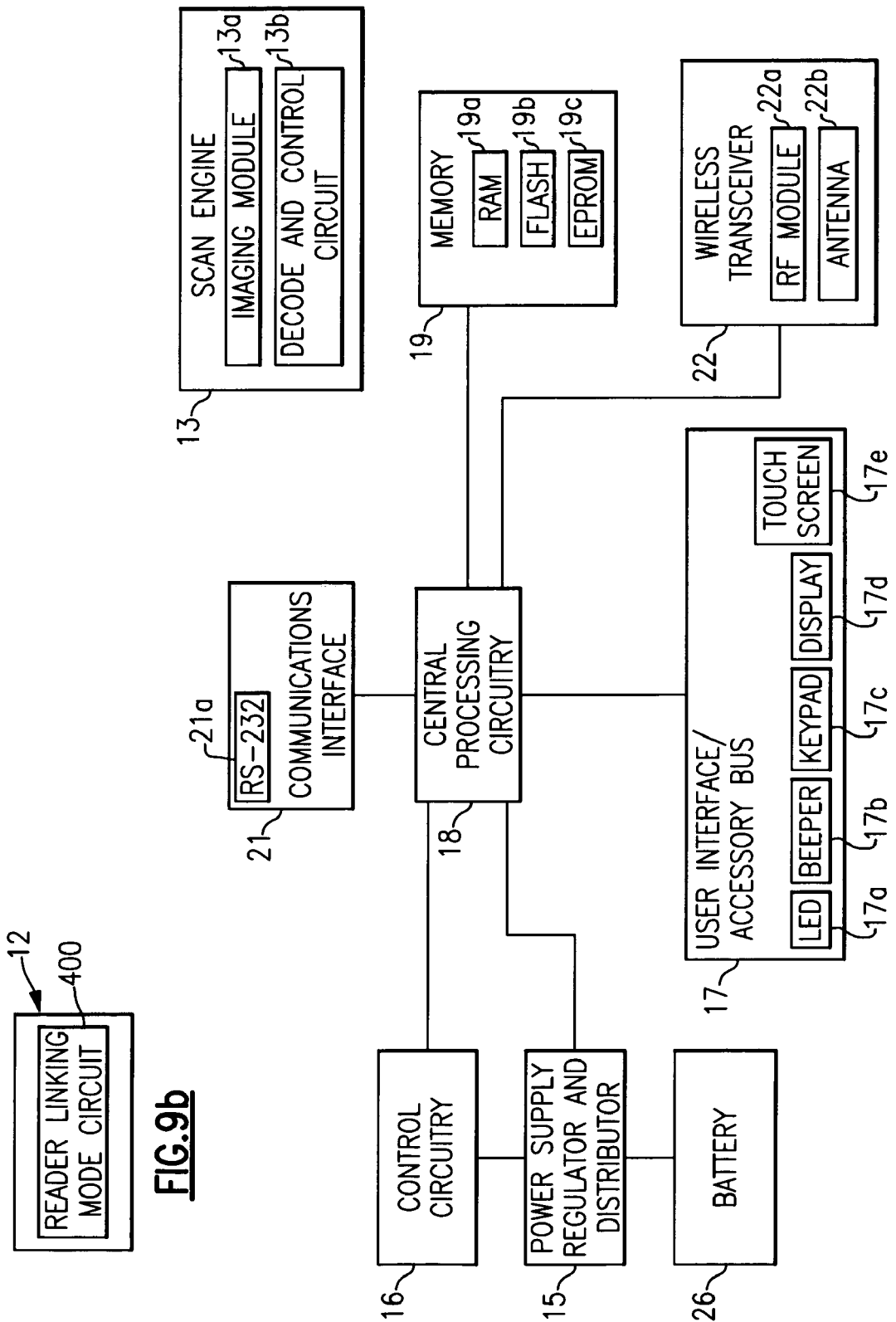

METHOD AND SYSTEM FOR LINKING A WIRELESS HAND HELD OPTICAL READER WITH A BASE UNIT OR OTHER WIRELESS DEVICE

BACKGROUND OF THE INVENTION

1. Field of the Invention

The present invention relates to optical devices in general, and more particularly, to the linking of a wireless hand held optical reader with a base unit or other wireless device.

2. Technical Background

In various commercial and industrial environments, the use of optical indicia, such as bar code symbols, has become the norm for identifying products and inventory. Typically, each item is marked with optical indicia associated with a description of the item and other attributes (for example, price) that are stored in a database of a host device or network system. Optical readers are used to read the optical indicia and provide that reading as input information to host devices. In some cases, the data is provided to the host devices via base units, which communicate with the optical reader. Examples of host devices include a computer (fixed or portable), a personal digital assistant (PDA), a portable data terminal (PDT), a point of sale (POS) terminal, a transaction terminal, cash register, or similar device. Checkout stations in retail settings typically employ stationary presentation-type optical readers, mobile hand held optical readers hardwired to a base unit, mobile wireless hand held optical readers that communicate wirelessly with a linked base unit, or some combination of the above to read optical indicia such as bar code symbols, or bar codes.

Stationary presentation-type optical readers, such as flat bed scanners, typically require a cashier to manually move an item bearing optical indicia into the field of view of the optical reader and orient the item such that the optical reader can scan the information and communicate this information to the cash register. While stationary presentation-type optical readers may be adequate for scanning encoded optical indicia on small items that are easily moved through their field of view by a cashier or other operator, these types of optical readers are not well suited for scanning large or heavy items that need to be repositioned by the cashier or customer so the scanner can read the optical indicia. This movement of large and/or heavy objects is inherently risky and undesirable. Furthermore, since stationary presentation-type optical readers require that the cashier position the item to be scanned somewhat precisely into the field of view of the optical reader so that the optical reader can scan the optical indicia, multiple attempts are often required to achieve a successful scan. This can lead to frustration by the cashier and customer and thus detract from customer satisfaction.

An advance upon the stationary presentation-type optical scanner is the use of a mobile hand held optical reader hardwired to a linked base unit. This configuration permits the cashier to manually move the hand held optical reader into position to scan an item's optical indicia, rather than having to move the item into the field of view of the optical reader as in the stationary presentation-type optical scanner. The scanned information from the optical indicia is then transmitted to the hand held optical reader's linked base unit via the hardwired connection between the two components. The base unit then communicates this information to the cash register. Alternatively, the hand held optical reader can be connected directly to the cash register. Unfortunately, this approach does not eliminate the problems associated with scanning items that are out of reach of the hardwired hand held optical reader and must be repositioned into the field of view of the optical reader so that the optical reader can scan the optical indicia.

In order to eliminate the limitations imposed by hardwiring the hand held optical reader to its base unit, another proposed approach is the use of a wireless optical reader that can communicate wirelessly with its linked base unit. In this approach, the wireless hand held optical reader is held in a base unit or docking cradle until needed to read optical indicia that are out of the view of a stationary presentation-type optical reader. The cashier can manually move the hand held optical reader into position to scan an item's optical indicia as long as the optical reader is within a distance where it can communicate wirelessly with its linked base unit. The scanned information is then transmitted to the hand held optical reader's linked base unit over the wireless connection. The base unit then communicates this bar code information to the cash register.

In the case of a mobile hand held optical reader hardwired to its individual base unit, this link between the reader and base unit is fixed and permanent. In the case of a wireless mobile hand held optical reader that communicates wirelessly with its individual base unit, this link can be made by programming the optical reader with information identifying the particular base unit so the optical reader directs its transmitted information to that base unit, or vice versa.

One prior art approach used for linking a wireless mobile hand held optical reader with an individual base unit is disclosed in U.S. Pat. No. 6,149,063 to Reynolds et al. In this approach, each base unit is assigned a unique bar code symbol that is scanned by the hand held optical reader to obtain information about the base unit to enable communication between the reader and the base unit.

Another prior art approach used for linking a wireless mobile hand held optical reader with an individual base unit is also discussed in U.S. Pat. No. 6,149,063 to Reynolds et al. In this approach, the hand held optical reader is physically inserted into a base unit. The hand held optical reader and base unit then exchange information via physical mating electrical connections to enable communications between the two devices.

While each of these prior art linking approaches increase the flexibility of the hand held optical reader systems over systems where the optical reader is permanently linked with a base unit, these approaches still have several disadvantages which limit the flexibility of the hand held optical reader to be used as an input device. For example, approaches where the hand held optical reader must scan optical indicia to obtain information about a base unit or other device requires each device to be linked to have unique optical indicia that can be read and understood by the optical reader. The approach whereby the hand held optical reader is linked using only the mating electrical connectors of the optical reader and base unit does not allow for confirmation that the radios in the devices are communicating or for linking between the hand held optical reader and other wireless devices that do not have mating electrical connectors.

SUMMARY OF THE INVENTION

It would thus be desirable in some instances to have a wireless optical device configured to operate in a plurality of user-selectable modes for linking a wireless hand held optical reader with either a base unit or other wireless device. For example, for an application at a cash register, it is necessary that the base unit associated with that particular cash register only receive data from hand held optical readers intentionally linked with that base unit and not from other hand held readers operating at different cash registers. In order to avoid any inadvertent communication between a wireless hand held optical reader from one cash register and a base unit from another cash register, the hand held optical reader is configured in a "reader-base linking mode" that requires a cashier to temporarily physically couple the optical reader and base unit together in order to initiate the linking process, which is then completed wirelessly between the devices. Requiring this temporary physical coupling between the two devices to initiate the linking reduces the risk of any inadvertent linking. Furthermore, initiating the linking process using a step, i.e., placing the hand held optical reader into the base unit, that is required for charging the optical reader anyway, eliminates unnecessary steps and makes use of the optical reader more convenient. In addition, completing the linking process wirelessly, allows the user to confirm that the hand held optical reader and base unit are communicating properly prior to performing any scanning operations.

As a further protection against inadvertent or undesired linking, the base unit can also be configured to operate in a plurality of user-selectable modes to control its linking with wireless hand held optical readers ("base-single reader mode (locked)," "base-single reader linking mode (open)," and "base-multiple reader linking mode"), including the ability to lockout other readers or allow for multiple readers to communicate with a single base unit. For other applications where the wireless hand held optical reader is to be linked with a device that cannot necessarily be physically coupled with the optical reader, the optical reader can be configured in a "reader-free linking mode" where the linking of the two wireless devices is accomplished without a physical connection. Thus, both the wireless hand held optical reader and the base unit include circuitry to switch between the plurality of user-selected linking modes. Furthermore, in order to have maximum flexibility for linking the wireless hand held optical reader with other devices, it is also desirable to not require the devices to be linked to have unique optical indicia associated with the devices.

Therefore, and according to one illustrative embodiment of the present invention, there is a retail store network comprising a cash register, server, and hand held optical reader for reading a bar code symbol of an article and generating a decoded out bar code data message. The hand held bar code reader has an electrical connector and wireless transceiver. The optical reader can be used with a base unit also having an electrical connector and wireless transceiver. The network is configured so that the hand held bar code reader and the base unit have one linking mode in which the address of the base unit is sent to the hand held bar code reader through their respective electrical connectors. The linking process is completed by way of wireless communication, including the transmission of the address of the hand held bar code reader to the base unit.

The hand held bar code reader according the present invention further comprises circuitry to allow the optical reader to also operate in a linking mode where it can link with other devices that it cannot physically mate its electrical connector with, but can initiate the linking and complete the process wirelessly.

It is to be understood that both the foregoing general description and the following detailed description are merely illustrative examples of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description, serve to explain the principles and operations of the invention.

BRIEF DESCRIPTION OF THE DRAWINGS

FIG. 7a is a perspective view of an imaging module support having mounting wings according to the present invention.

FIGS. 7b-7c are perspective views of an imaging module according to the present invention.

FIG. 7d is an assembly view of an imaging module according to the present invention.

FIG. 9a is a electrical block diagram of the optical reader according to the present invention.

FIG. 9b is a schematic block diagram illustrating the incorporation of a reader linking mode circuit into the optical reader according to the present invention.

DETAILED DESCRIPTION OF THE PREFERRED EMBODIMENTS

Figure 1:
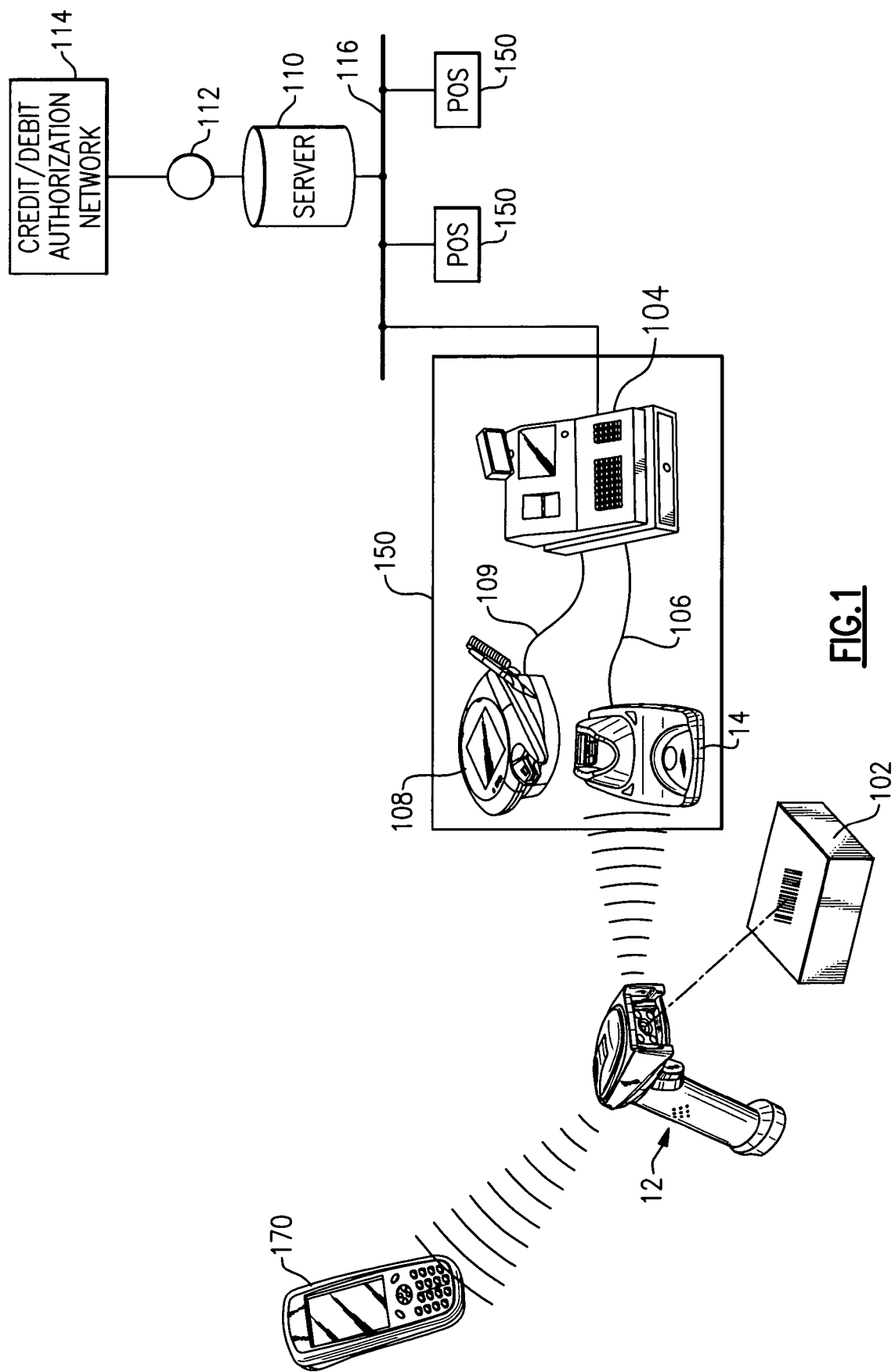
FIG. 1 is a block diagram of a typical retail store network in which an embodiment of the present invention can be used.

Reference will now be made in detail to the present preferred embodiments of the invention, examples of which are illustrated in the accompanying drawings. Whenever possible, the same reference numerals will be used throughout the drawings to refer to the same or like parts for clarity.

As shown in FIG. 1, the present invention can be used as part of a retail store network 100 at a point of sale (POS) 150. In the illustrative retail store network 100 of FIG. 1, the hand held optical reader 12 scans an item's 102 bar code symbol, decodes the information contained in the bar code symbol, and wirelessly communicates the decoded bar code data associated with that item 102 to the base unit 14 linked with the hand held optical reader 12. The base unit 14 then communicates that bar code data message to a host device such as a cash register 104, which can also be located at the point of sale 150. The base unit 14 communicates this bar code message to the cash register 104 via a hardwired connection 106 to the computer of the cash register 104, such as, for example, a USB connection or a RS-232 serial connection.

In addition to the hand held optical reader 12, base unit 14, and cash register 104, the point of sale 150 may also include a transaction terminal 108 that is also connected to the cash register 104 via a hardwired connection 109 to the computer of the cash register 104, such as, for example, a USB connection or a RS-232 serial connection. The transaction terminal 108 allows a customer to use a credit card or debit card, electronic benefits card, or customer loyalty card during or to complete a transaction at the point of sale 150. In order to process the customer transaction, the transaction terminal 108 is connected to an in-store server 110 through a network backbone 116. The server 110 may, through an appropriately configured gateway 112, be in communication with a credit/debit authorization network 114. In response to an authorization request that includes a customer account number and a purchase amount, credit/debit authorization network 114 through gateway 112 may, in one embodiment, either decline a requested purchase transaction or approve a requested purchase transaction. When credit/debit authorization network 114 approves a transaction, credit card company accounts, retailer accounts, and customer accounts are appropriately credited or debited.

Returning to the operation of the wireless optical device 10, after the base unit 14 communicates an item's 102 bar code information to the cash register 104, the cash register 104 communicates that information to the store server 110 that, among a variety of functions and responsibilities, may store in its memory or otherwise have access to a price lookup table. When the store server 110 receives the item's 102 bar code data message, it can correlate the price associated with that item 102 and communicate that price to the cash register 104. In addition to pricing information, the server 110 could also communicate additional information about the item 102, including, for example, inventory information about the item 102, present or future promotions involving the item, or related accessories a customer may be interested in purchasing.

Figure 2:
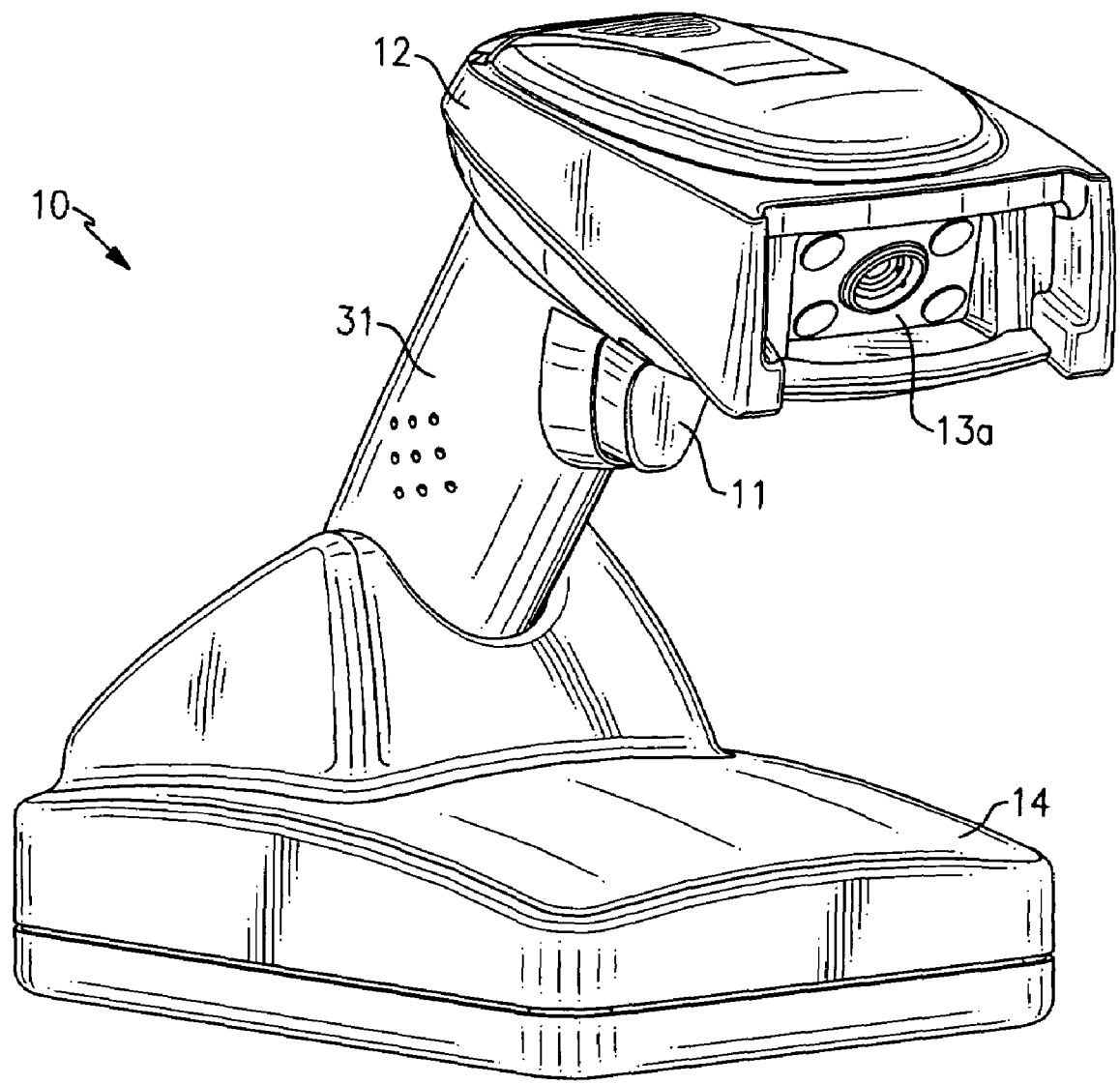
FIG. 2 is a perspective view of an optical device embodiment according to the present invention.
Figure 3:
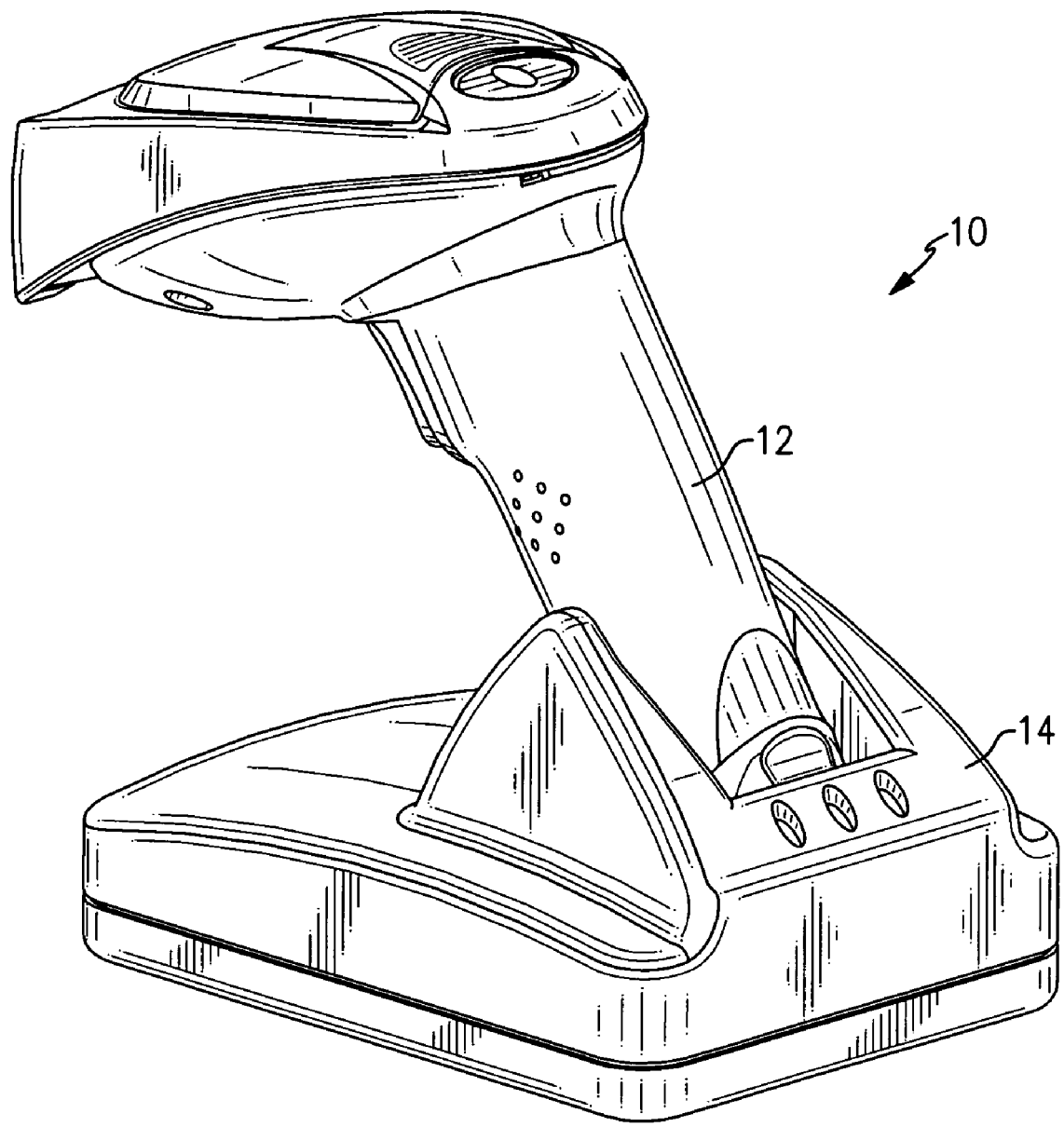
FIG. 3 is a perspective view showing the right side and rear of the optical device according to the present invention.

According to one embodiment of the present invention, as shown in FIGS. 2-3, the optical device 10 includes a hand held optical reader 12 and a base unit 14. The hand held optical reader 12 can be any device capable of reading optical indicia, such as bar code symbols, including linear, two dimensional, and matrix, and may be in the form of an optical scanner or imager. Examples of optical indicia include PDF417, MicroPDF417, MaxiCode, Data Matrix, QR Code, Aztec, Aztec Mesas, Code 49, EAN-UCC Composite, Snowflake, Dataglyphs, Code 39, Code 128, Codabar, UPC, EAN, Interleaved 2 of 5, Reduced Space Symbology, Code 93, Codablock F, and BC412, Postnet, Planet Code, British Post, Canadian Post, Japanese Post, KIX (Netherlands) Post, OCR-A, OCR-B.

Turning to FIG. 9a, there is shown in block diagram form the internal components of the hand held optical reader 12. It will be appreciated by those of ordinary skill in the art that although the hand held optical reader 12 is described as separate functional components, the functions of any of the separate components may be combined. The hand held optical reader 12 includes a scan engine 13 for decoding optical indicia. The disposition of the scan engine 13 within the hand held optical reader 12 may be more clearly understood with reference to FIG. 6, which shows the hand held optical reader 12 docked with the base unit 14 to form the wireless optical device 10. The cover of the hand held optical reader 12 has been removed in FIG. 6 to show the scan engine 13. The scan engine 13 is an optical reader that may be a laser scanning engine or an image capture device.

Figure 6:
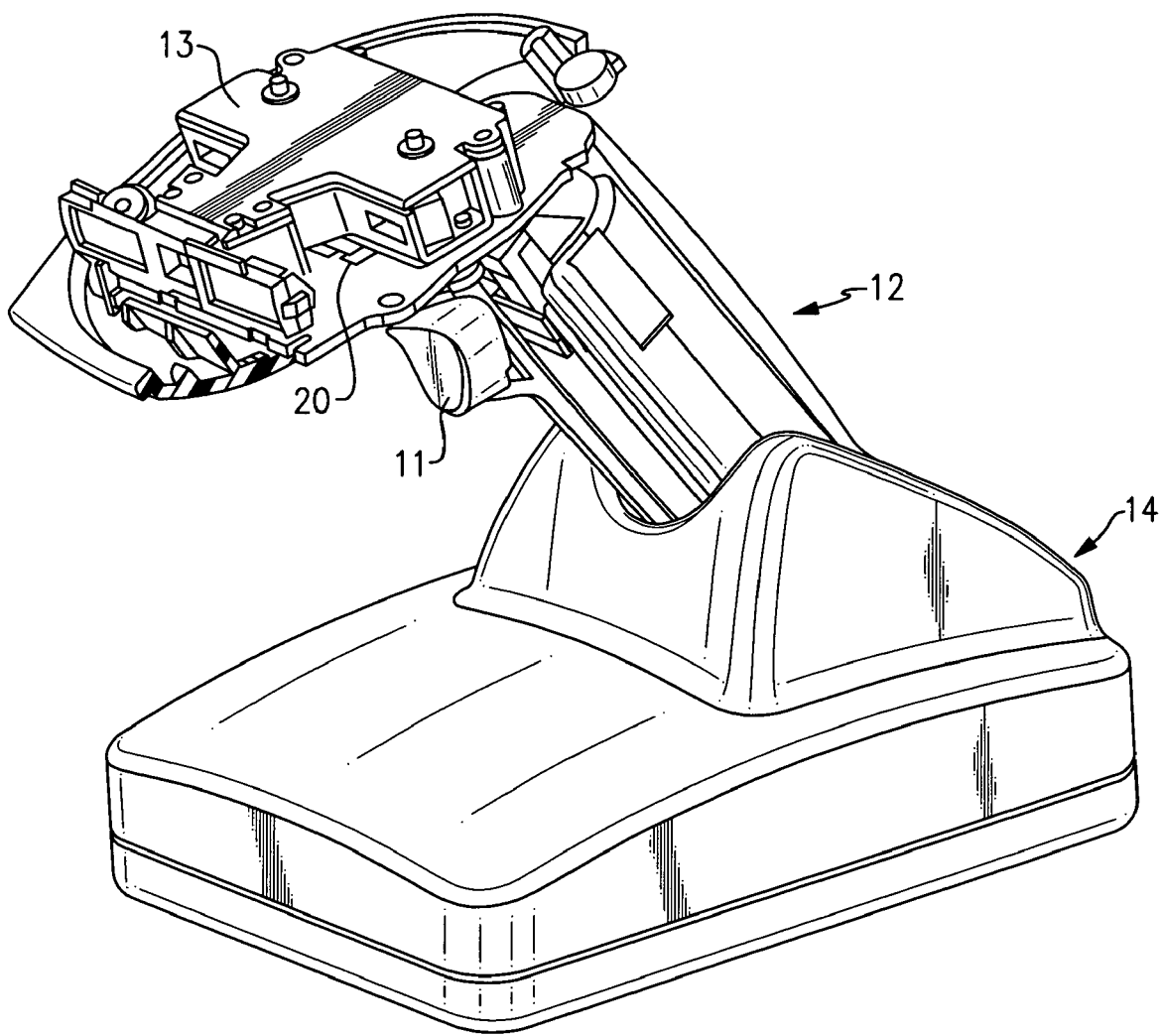
FIG. 6 is a perspective view of the optical reader according to the present invention in which the cover is removed to show the image capture assembly.

Referring to FIG. 9a, the scan engine 13 of the preferred embodiment consists of, among other things, an imaging module 13a and an imaging module decode and control circuit 13b. Imaging module 13a in the embodiment of FIG. 6 is an Image Team 4X10/80 SR/SF imaging module with decoding functionality available from HHP, Inc. of Skaneateles Falls, N.Y., and is capable of decoding the following symbologies: PDF417, MicroPDF417, MaxiCode, Data Matrix, QR Code, Aztec, Aztec Mesas, Code 49, EAN-UCC Composite, Snowflake, Dataglyphs, Code 39, Code 128, Codabar, UPC, EAN, Interleaved 2 of 5, Reduced Space Symbology, Code 93, Codablock F, and BC412, Postnet, Planet Code, British Post, Canadian Post, Japanese Post, KIX (Netherlands) Post, OCR-A, OCR-B. This imaging modules are shown in greater detail in the exploded views of FIGS. 7a-7d. Imaging module 13a includes a support 6380 having a containment 6381 containing image sensor chip 6332, and a retainer section 6382 retaining a lens assembly 6340 shown as being provided by a lens barrel. Lens assembly 6340 may include fixed optics configured so that imaging module 13a has a best focus receive distance of less than two feet (e.g. 3 in., 7 in., 9 in). Lens assembly 6340 can also include adjustable optics varying the best focus distance of module 13a, or fixed optics such that a best focus receive distance of module 13a is more than two feet. A first circuit board 6314a carrying image sensor chip 6332 and aiming LEDs 6318 is mounted to a back end of support 6380 while a front circuit board 6314b carrying illumination LEDs 6316 is mounted to a front end of support 6380. An optical plate 6326 carrying aiming and illumination optics is disposed forward of second circuit board 6314b. Supporting the various components of imaging module 13a are a plurality of conductive support posts 6384. Imaging module 13a can include mounting wings 6380w for aiding in the installation of imaging module 13a in a device housing. Imaging module 13a has a form factor of about 2.0 cm by 1.2 cm by 1.2 cm.

The control and decode circuit 13b (which may be termed a capture and decode circuit) captures images via actuation of module 13a. Control and decode circuit 13b presents decoded out messages and/or image data, such as frames of image data to central processing circuitry 18. Control and decode circuit 13b can be incorporated in a separate printed circuit board or can also be incorporated in a circuit board of the imaging module 13a.

Returning to FIG. 9a, it can be seen that the hand held optical reader 12 further includes central processing circuitry 18 and the control circuitry 16 that may be incorporated into one or more printed circuit boards. As shown in FIG. 9a, the control circuitry 16 is a separate electrical element that includes circuitry for power management. The hand held optical reader 12 further includes a wireless transceiver 22, such as, for example a wireless Bluetooth, IEEE 802.11b, ZigBee, or other standardized or proprietary RF device. The wireless transceiver 22 consists of an RF module 22a and antenna 22b and is configured to engage in two-way communication with at least one other wireless transceiver. The other wireless transceiver 32 can be located in the base unit 14, which can be a stand-alone unit or physically incorporated into another device such as a computer, a point of sale (POS) terminal, a transaction terminal, cash register, or similar device. Returning to FIG. 6, a printed circuit board 20 is coupled to the scan engine 13. The printed circuit board 20 includes the wireless transceiver 22.

Figure 4:
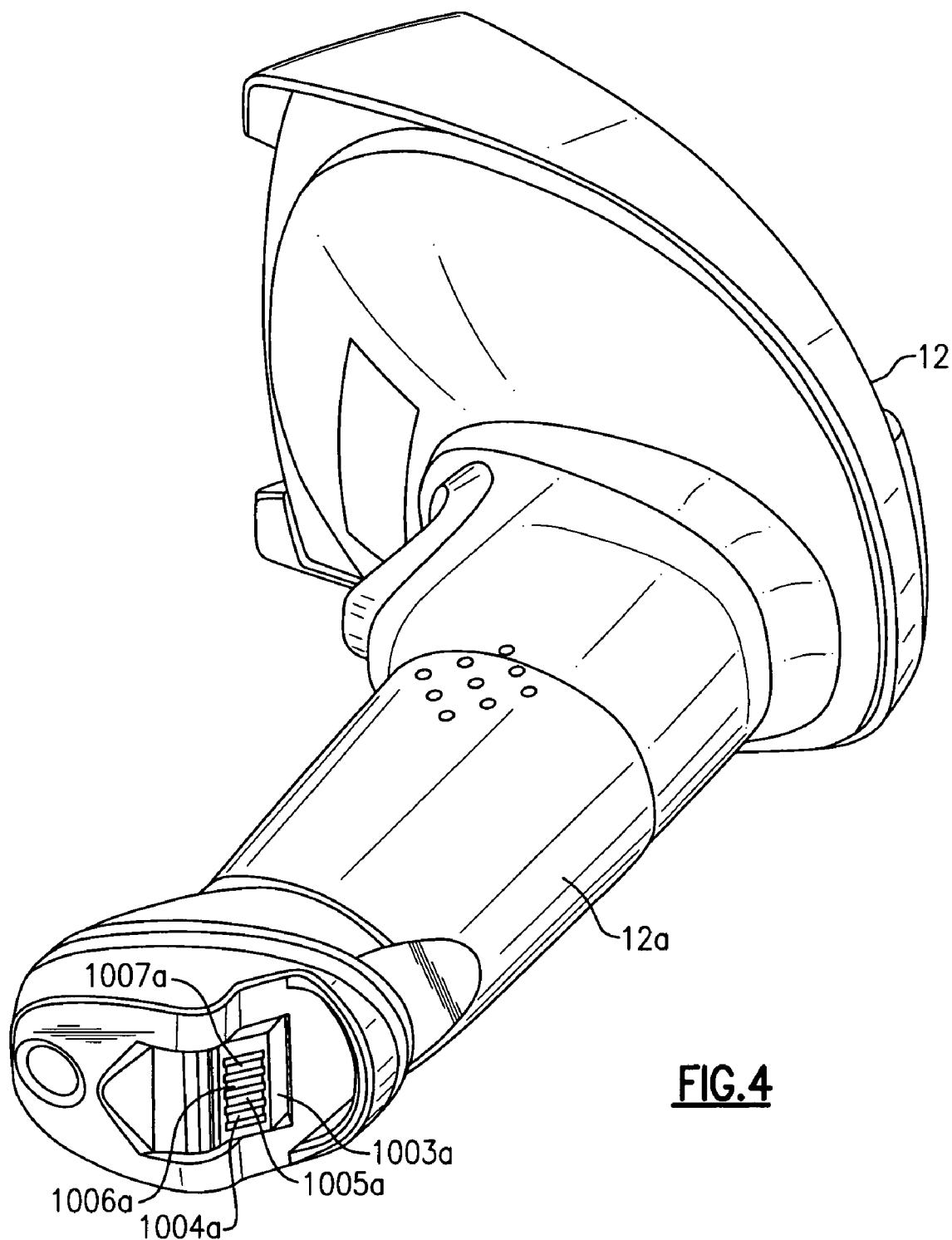
FIG. 4 is a perspective view of the hand held optical reader according to the present invention showing its mating connector.
Figure 5:
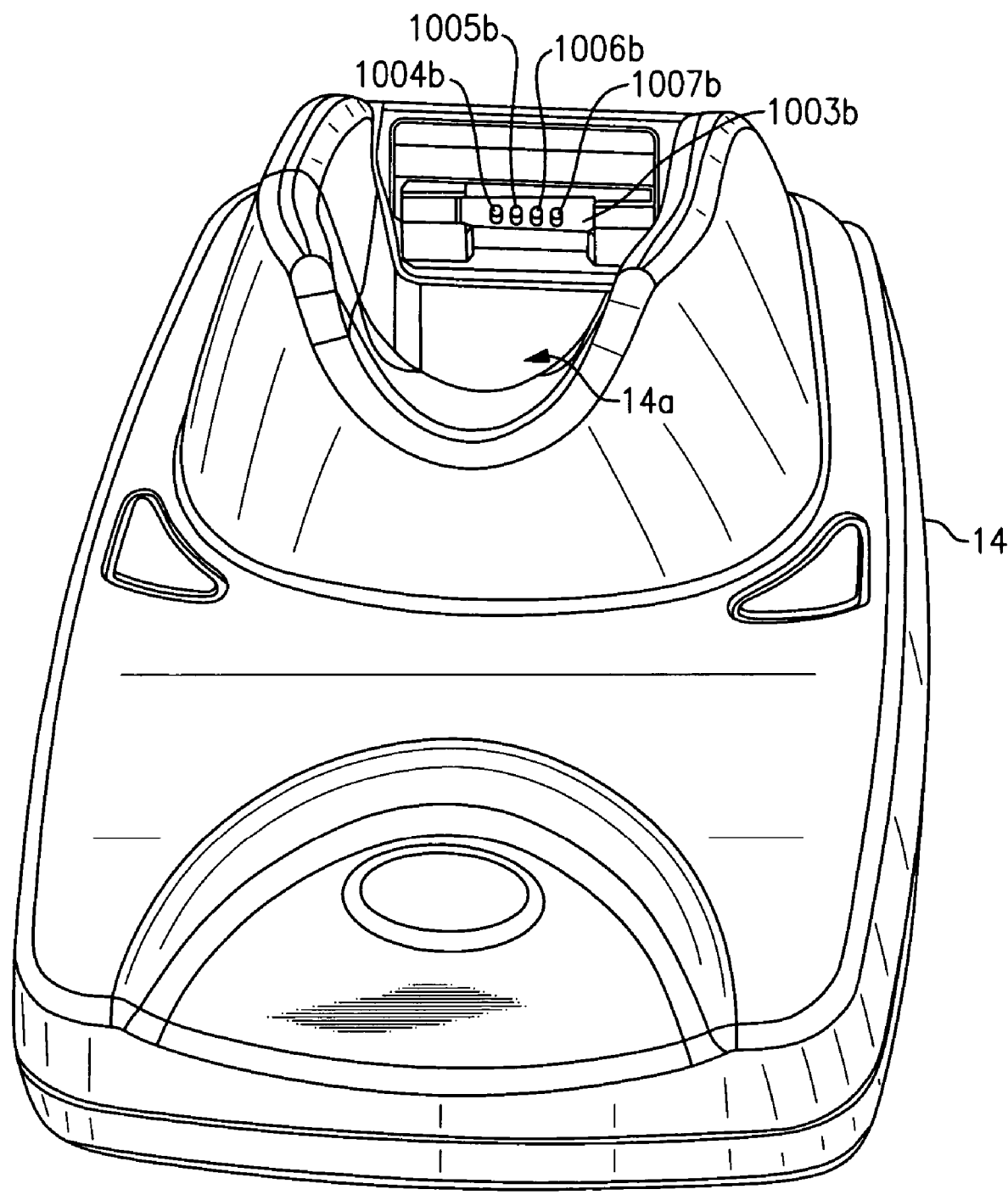
FIG. 5 is a perspective view of the base unit according to the present invention showing its mating connector.

The base unit 14 can be a docking cradle capable of charging the hand held optical reader 12 or other device providing access to a host device. As can be best seen in FIG. 3, the housing of the hand held optical reader 12 and the housing of the base unit 14 are complementarily shaped and configured so that the optical reader 12 is received and supported by the base unit 14. More specifically, as can also be seen in FIGS. 4 and 5, in one embodiment of the present invention, the lower portion of the handle 12a of the optical reader 12 is shaped and configured to be inserted into a complementarily sized socket 14a of the base unit 14, which can then support and hold the optical reader 12. For example, the housing of the optical reader 12 can be constructed so as to ensure that it forms a friction fit connection with the base unit 14 when inserted into the socket 14a. Also as shown in FIGS. 4 and 5, both the hand held optical reader connector 1003a and the base unit connector 1003b are placed toward the rear portions on the devices in such a way so as to take advantage of effect of gravity on the optical reader 12, which will tend to lean forward when it is docked in the base unit 14. This leaning forward causes the two connectors to be in more solid contact due to their rear placement.

While in the base unit 14, the hand held optical reader 12 is configured to operate in "presentation mode". As used herein, presentation mode, refers to the operational state of the hand held optical reader 12 in which the hand held optical reader 12 is continuously attempting to capture and decode images or an automatic trigger mode in which the hand held optical reader 12 only captures an image and attempts to decode the image when an object is placed within the field of view of the image sensor of the hand held optical reader 12. A hand held optical reader 12 configured for operation in an automatic trigger mode form of presentation mode may include sensors, such as, for example motion sensors, infrared sensors or acoustical sensors to determine when an object has been placed in field of view of the image sensor.

Figure 11:
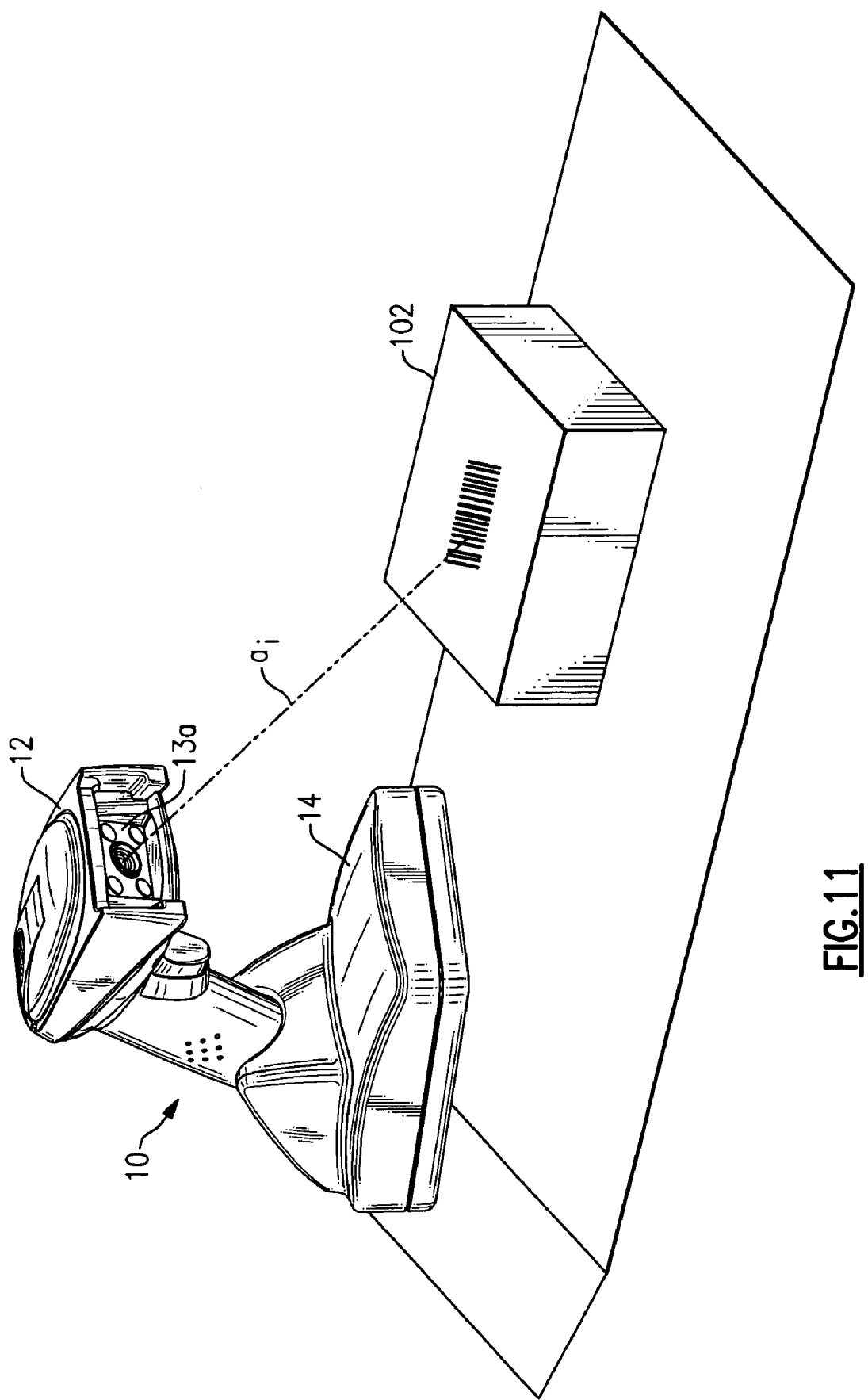
FIG. 11 is a perspective view of the optical device reading optical indicia according to the present invention.

As shown in FIGS. 2 and 3, the base unit 14 is configured to hold the hand held optical reader 12 in a position that is advantageous for reading optical indicia. As shown in FIG. 11, the scan engine 13 of the hand held optical reader 12 includes an imaging axis $a_i$. The imaging axis $a_i$ is the optical axis about which the scan engine 13 captures an image of optical indicia. FIG. 11 shows the hand held optical reader 12 deployed to read bar codes in a commercial setting. The base unit 14 is configured to position the imaging axis $a_i$ of the hand held optical reader 12 to read bar codes on items 102 that slide along the counter and are either parallel to the counter, substantially perpendicular to the counter, or anywhere in between without removing the hand held optical reader 12 from the base unit 14. Preferably, the hand held optical reader 12 is oriented to avoid illuminating a user or customer with its onboard illumination sources.

The hand held optical reader 12 may also include a manual trigger 11. The trigger 11 is positioned for operation of the fingers of the operator's hand that is used to grasp the hand held optical reader 12. The trigger 11 is used to signal the hand held optical reader 12 to capture an image when the hand held optical reader 12 is in manual mode.

As used herein "manual mode" refers to the operational state of the hand held optical reader 12 that requires manual trigger activation by the operator in order for the hand held optical reader 12 to capture and attempt to decode an image. The hand held optical reader 12 may be switched between manual mode and presentation mode by a number of techniques, including the decoding of an optical indicia containing instructions to switch from one mode to another, using a switch on the hand held optical reader 12 to toggle between operational modes, or sending an instruction from a cash register 104 via the data port of the base unit/hand held optical reader connection 1003. The hand held optical reader 12 may also be configured to change operational modes based on the operation of the trigger 11. For example, in one embodiment, when the trigger 11 is depressed or activated, the hand held optical reader 12 temporarily enters into manual mode for a predetermined period of time, such as, for example fifteen seconds, and then returns to presentation mode. Additionally, in some applications it may be desirable to have the hand held optical reader 12 always function in a presentation mode. In that instance the hand held optical reader 12 may be programmed to be constantly in presentation mode.

Figure 8:
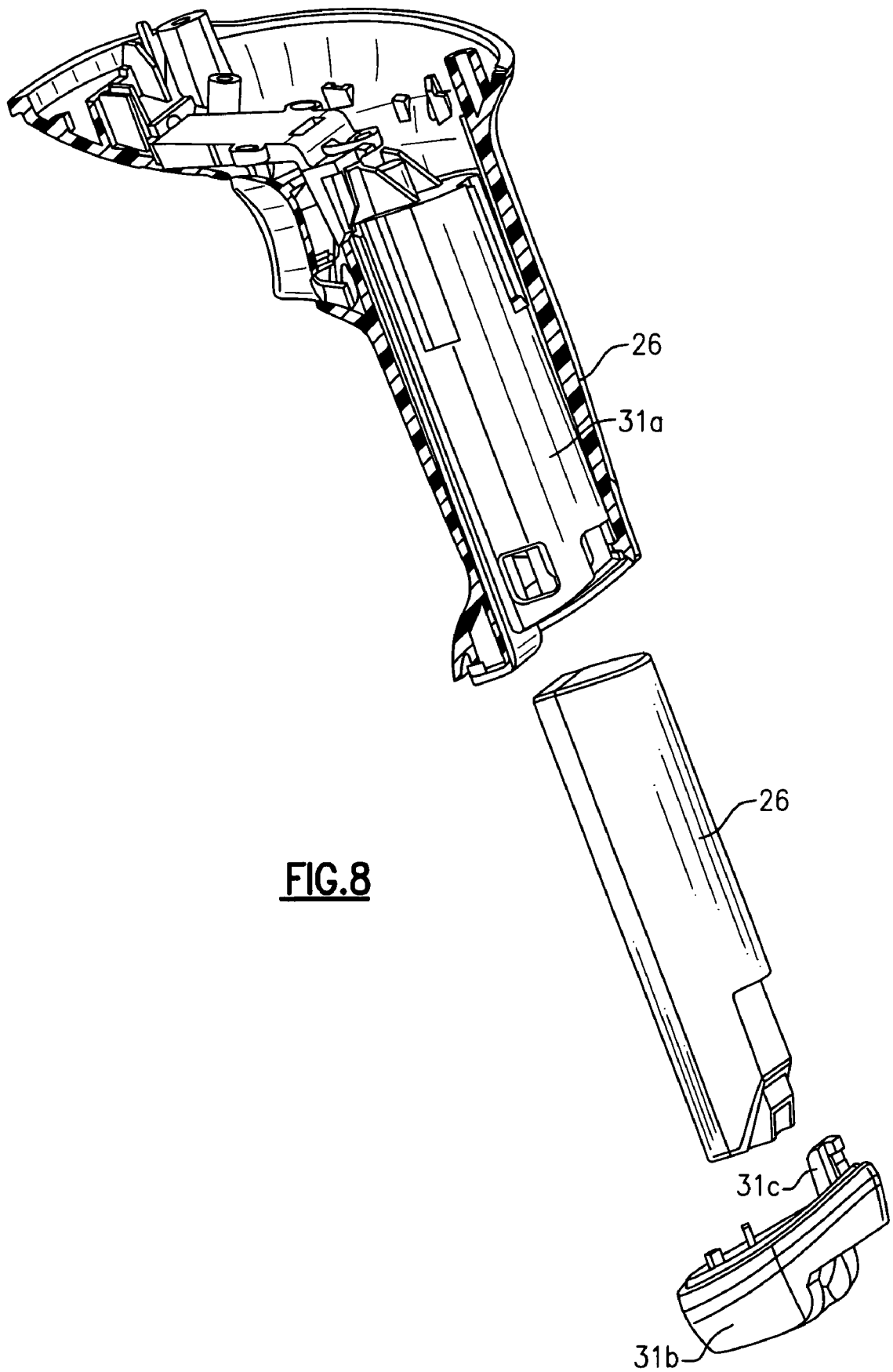
FIG. 8 is an exploded cut away view of the optical reader according to the present invention.

Returning to FIG. 9a, the hand held optical reader 12 is powered by a rechargeable battery 26, such as, for example a NiCad or Lithium ion battery. In the present embodiment, the battery 26 is electrically connected to a power supply regulator and distributor 15, which is then connected to the control circuitry 16 and the central processing circuitry 18. Power can then be supplied to the other elements via the control circuitry 16 and the central processing circuitry 18. Alternatively, the power supply regulator and distributor 15 can be directly connected to the additional elements. Turning to FIG. 8 there is shown a cut away, exploded view of the handle portion 31 of the hand held optical reader 12. The handle portion 31 is made from a high impact plastic and includes a battery housing 31a. The battery housing 31a is an elongate tubular member that defines a volume for receiving the battery 26. When installed in the battery housing 31a, the terminals (not shown) of the battery 26 engage electrical contacts inside the battery housing 31a, thereby providing electrical power to the hand held optical reader 12. The battery 26 is retained in the battery housing 31a by an end cap 31b. The end cap 31b includes resilient fingers that engage complementary structures in the handle 31 or battery housing 31a to secure the end cap 31b in place. In an alternative embodiment, separate mechanical fasteners, such as, for example screws may be used to couple the end cap 31b to the handle 31. In addition, a fast release fastener may be used. Returning to FIG. 9a, the central processing circuitry 18 receives the decoded optical indicia information from the scan engine 13 and sends an electrical signal containing the decoded information to the wireless transceiver 22. Alternatively, if the scan engine does not include an imaging module decode and control circuit 13b, the central processing circuitry 18 can include image processing circuitry for evaluating a captured image to determine if it contains decodable indicia and for decoding indicia in the captured image. If the image processing circuitry is able to decode optical indicia in the captured image, the image processing circuitry sends an electrical signal containing the decoded information to the wireless transceiver 22. In the embodiment shown, the wireless transceiver 22 includes a RF module 22a and an antenna 22b. The wireless transceiver 22 then transmits the decoded information to a wireless transceiver 32 in the base unit 14.

The hand held optical reader 12 further includes electronic memory 19 both for storing operating instructions and for storing captured images and for use in the processing of the captured images. The memory may, for example, include random access memory 19a, flash memory 19b, and erasable programmable read-only memory (EPROM) 19c. As will be appreciated by those of ordinary skill in the electrical arts, the forgoing examples of memory types are illustrative of the types of memory that may be used in the present invention and are in no way limiting to the scope of the invention and that other suitable memory types may be used depending upon the applicable design criteria without the need for undue experimentation.

The hand held optical reader 12 may further include a user interface/accessory bus 17. The user interface may include light emitting diodes (LEDs) 17a, a beeper 17b, a keypad 17c, a display 17d, a touch screen 17e, or any combination thereof. In addition, the hand held optical reader can also include a communications interface 21 (e.g., RS-232 port 21a), allowing for diagnostics of the device.

Figure 10A:
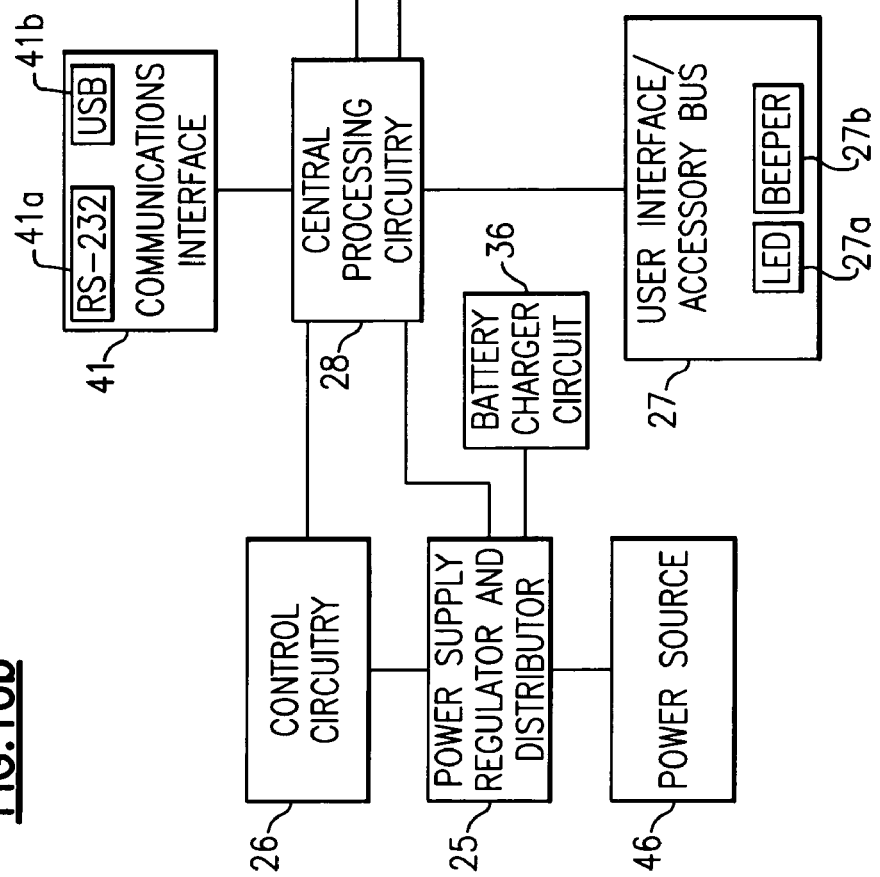
FIG. 10a is an electrical block diagram of the base unit according to the present invention.

Turning to FIG. 10a, there is shown in schematic of the electronic components of a wireless transceiver equipped base unit 14 in block diagram form. It will be appreciated by those of ordinary skill in the art that although the base unit 14 is described as separate functional components, the functions of any of the separate components may be combined. The base unit 14 includes central processing circuitry 28 and control circuitry 26 that may be incorporated into one or more printed circuit boards. The base unit 14 further includes a wireless transceiver 32, such as, for example a wireless Bluetooth, IEEE 802.11b, ZigBee, or other standardized or proprietary RF device. The wireless transceiver 32 consists of an RF module 32a and antenna 32b and is configured to engage in two-way communication with at least one other wireless transceiver. The other wireless transceiver 22 is located in the optical reader 12 as shown in FIG. 9a.

The base unit is powered by a power source 46, such as, for example a AC source from a wall receptacle (e.g., 120VAC) or can be powered by a host device. In the present embodiment, the external power source 46 is connected to a power supply regulator and distributor 25, which is then connected to the control circuitry 26 and the central processing circuitry 28. Power can then be supplied to the other elements via the control circuitry 26 and the central processing circuitry 28. Alternatively, the power supply regulator and distributor 25 can be directly connected to the additional elements.

The base unit 14 further includes electronic memory 29 for storing operating instructions. The memory may, for example, include random access memory 29a, flash memory 29b, and erasable programmable read-only memory (EPROM) 29c. As will be appreciated by those of ordinary skill in the electrical arts, the forgoing examples of memory types are illustrative of the types of memory that may be used in the present invention and are in no way limiting to the scope of the invention and that other suitable memory types may be used depending upon the applicable design criteria without the need for undue experimentation.

The base unit may further include a user interface/accessory bus 27. The user interface may include light emitting diodes (LEDs) 27a and a beeper 27b, or any combination thereof. In addition, the base unit 14 includes a communications interface 41 (e.g., RS-232 port 41a and USB 41b), allowing for communications between the base unit 14 and a host device. In one embodiment shown in FIG. 1, the base unit 14 is coupled to the cash register 104 by electrical cabling 106. The electrical cabling 106 is connected to a communications port of the cash register 104. The electrical cabling 106 includes data communication lines and may also include power lines to provide the external power source 46.

The base unit 14 further includes a battery charger circuit 36 for recharging the battery 26 of the hand held optical reader 12. The battery charger of the base unit 14 may be a contact type charger or an inductive type charger, and may be a fast charger, a trickle charger or a charger that is selectively switchable between fast and trickle charging modes. The power management circuitry in the hand held optical reader's control circuitry 16 controls the operation of the battery charger circuit 36.

As shown in FIGS. 4 and 5, the hand held optical reader 12 is equipped with a connector 1003a for connecting the hand held optical reader 12 to the complementary or mating connector 1003b of the base unit 14. The connection 1003 between the hand held optical reader connector 1003a and base unit connector 1003b may be, for example an RS-232 interface, an RS-422 interface, or a magnetic induction interface. Although the embodiment disclosed involves the coupling of the hand held optical reader 12 and a complementary base unit 14, the optical reader 12 could also be coupled to other devices having an appropriate mating connector.

Figure 12:
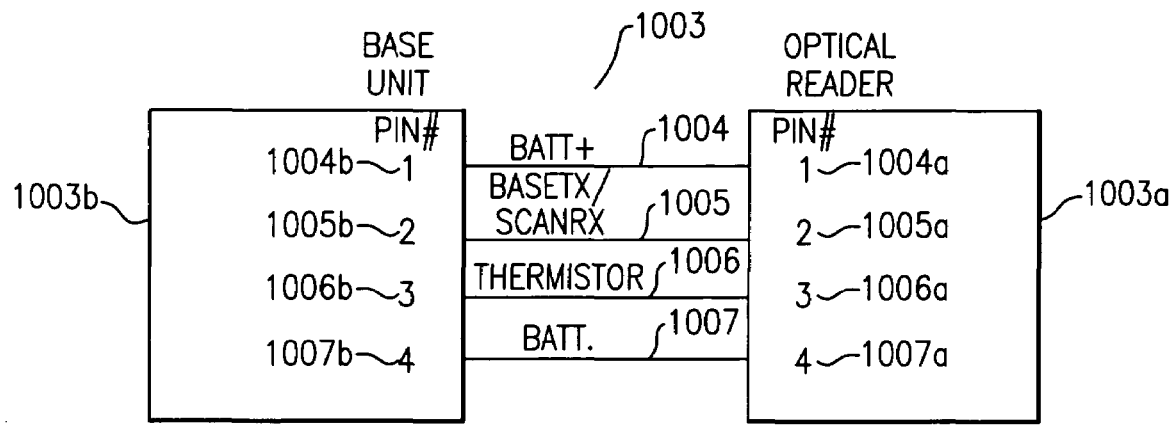
FIG. 12 is a diagram of the connection between the hand held optical reader connector and base unit connector of FIGS. 4 and 5 according to the present invention.

In one embodiment, the connection 1003 consists of the mating of two, four-pin connectors as shown in FIG. 12. Pins 1 (BATT+) 1004 and 4 (BATT−) 1007 of the connection 1003 are dedicated to providing electrical power from the base unit 14 to charge the battery 26 of the hand held optical reader 12. Pin 3 (THERMISTOR) 1006 of the connection 1003 monitors the temperature of the battery 26 in the hand held optical reader 12, providing input to the power management circuitry in the hand held optical reader's control circuitry 16, which controls the charging of the battery 26. Pin 2 (BASETX/SCANRX) 1005 of the connection 1003 is used by the base unit 14 to sense the presence of the hand held optical reader 12 and transmit information from the base unit 14 to the hand held optical reader 12.

In another embodiment, the wireless optical device 10 is configured for operation in a hostile environment. For example, if the wireless optical device 10 is to be used in a high humidity environment, both the hand held optical reader 12 and the base unit 14 may be hermetically sealed units. In this embodiment, the battery charger 36 of the base unit 14 would charge the battery 26 by magnetic induction. The hand held optical reader 12 may communicate with the base unit 14 using an optical communication system, such as, for example a free space infrared system when the hand held optical reader 12 is docked to the base unit 14 in addition to communication via the wireless transceivers. Alternatively, the hand held optical reader 12 and the base unit 14 could be configured to communicate with one another using magnetic induction when the hand held optical reader 12 is docked to the base unit 14.

Additionally, the wireless optical device 10 may be configured such that hand held optical reader 12 and the base unit 14 are electrically isolated from one another. Data transfer between the electrically isolated base unit 14 and the hand held optical reader 12 may be accomplished using, for example, an optical link or an inductive electromagnetic link. Similarly, power may be supplied to the hand held optical reader 12 by magnetic induction. Such a system may prove advantageous in an environment where the risk of an electrical spark must be minimized, such as, for example regions where combustible vapors are present.

Returning to the retail store network 100 of FIG. 1, it is noted that a typical retail store network 100 will include a plurality of points of sale 150, and therefore a plurality of wireless hand held optical readers 12 and base units 14. As discussed above, it is necessary to link the hand held optical reader 12 with an individual base unit 14 to allow the hand held optical reader 12 to communicate scanned optical indicia information, i.e., decoded bar code data, to its base unit 14, which then communicates scanned information to the cash register 104. This link can be made by programming the hand held optical reader 12 with information identifying the particular base unit 14 so that the optical reader 12 directs its transmitted information to that base unit 14. Given the wireless nature of the communication between the hand held optical readers 12 and base units 14, it is an object of the present invention to provide a linking method between the base unit 14 and the hand held optical reader 12 to ensure that the communication of an item's 102 bar code data message at a particular point of sale 150 be communicated to the base unit 14 associated with the cash register 104 at that point of sale 150 and no others.

Figure 13:
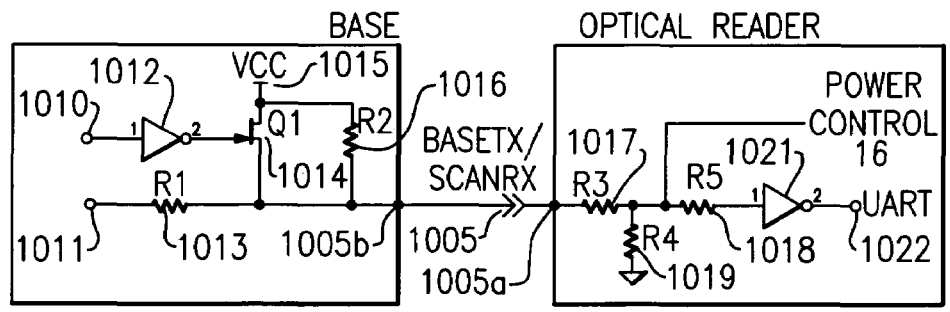
FIG. 13 is an electrical schematic of the communications line connection between the hand held optical reader and base unit according to the present invention.
Figure 14:
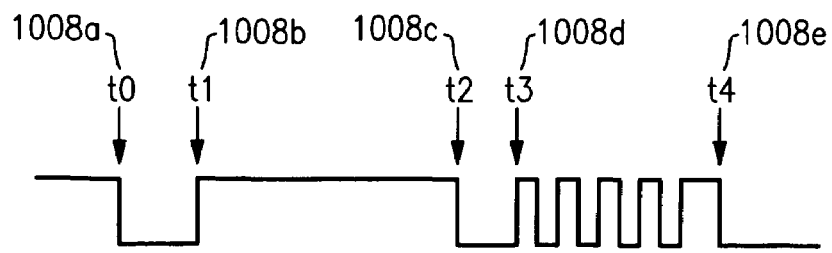
FIG. 14 is a state diagram of the communications line connection between the hand held optical reader and base unit according to the present invention.
Figure 15A:
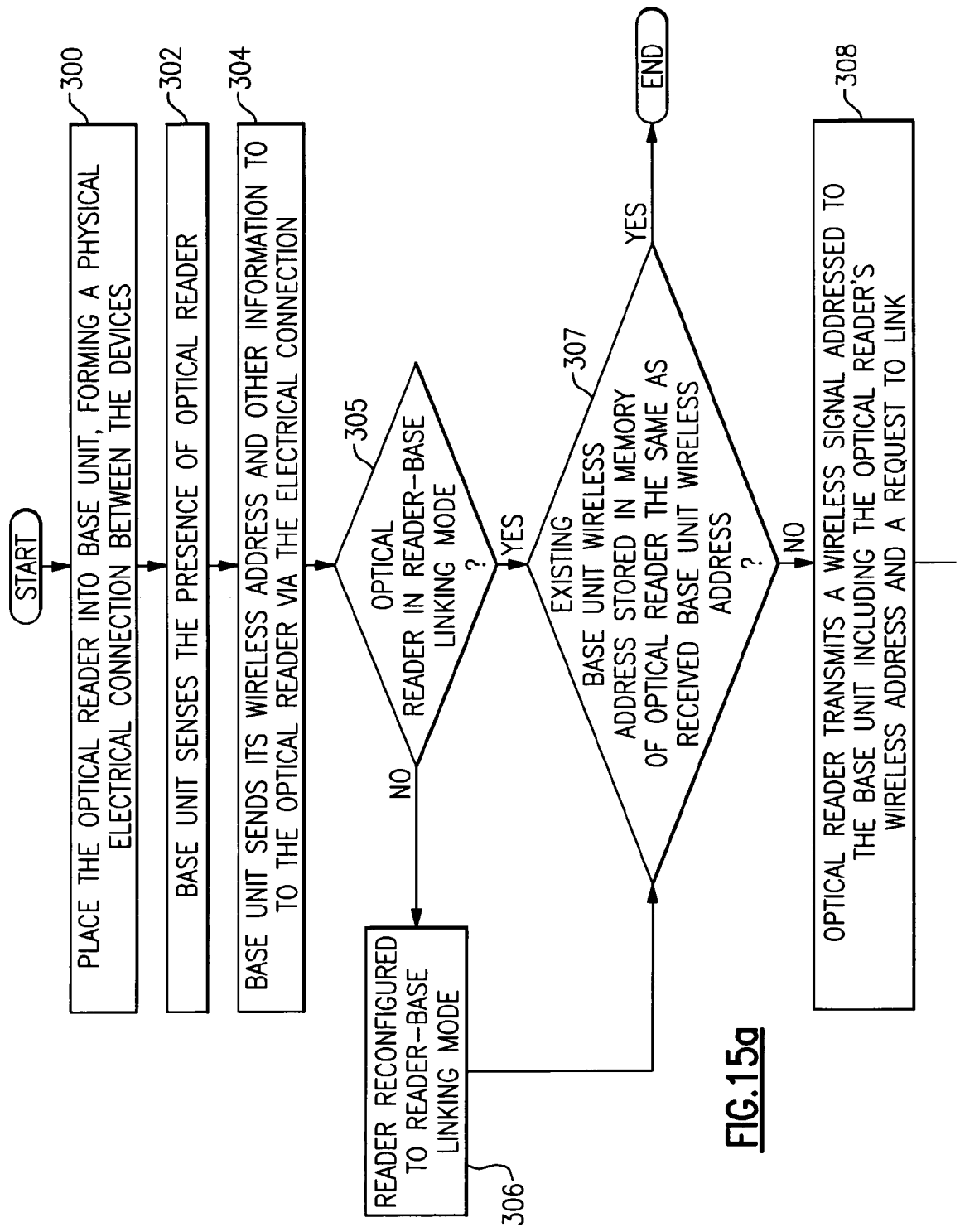
FIGS. 15a and 15b are flow diagrams illustrating the operation of the method of linking the hand held optical reader and a base unit according to the present invention.
Figure 15B:
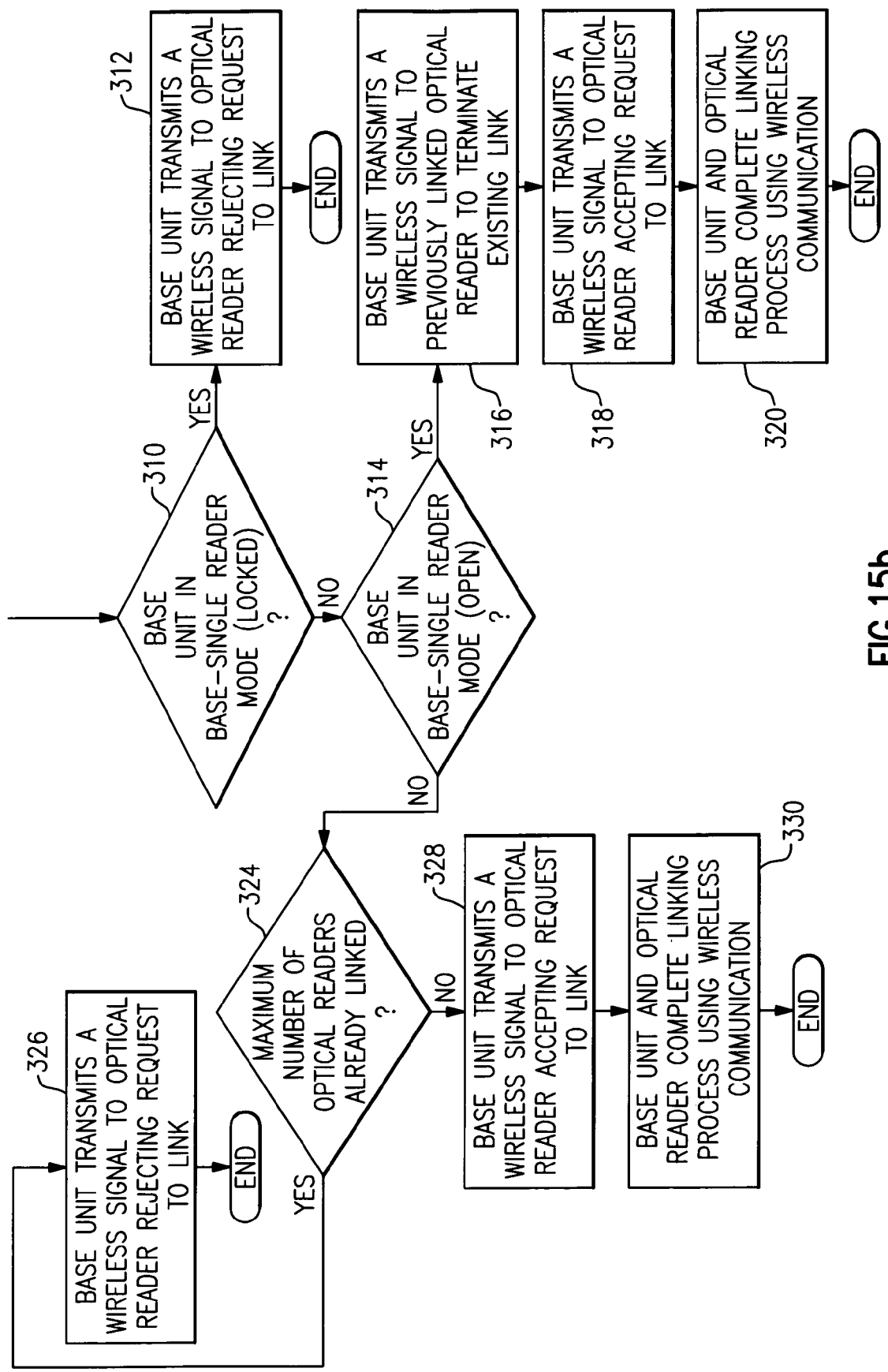

FIGS. 15a and 15b are flow diagrams illustrating the operation of the method of linking the wireless hand held optical reader 12 with a base unit 14 in accordance with the present invention. The user initiates the linking process at step 300 (time t0 1008a) by placing the hand held optical reader 12 into the base unit 14, establishing the temporary physical electrical connection 1003 between the two devices. When the hand held optical reader connector 1003a shown in FIG. 4 is engaged with the base unit connector 1003b shown in FIG. 5, the base unit 14 can transmit information to the hand held optical reader 12 without using a wireless system. The BASETX/SCANRX line 1005 of this connection 1003 can be used by the base unit 14 to sense the presence of the hand held optical reader 12 and transmit information about itself to the hand held optical reader 12 to link the devices with one another as shown in FIG. 12. FIG. 13 shows a schematic of the BASETX/SCANRX line 1005 of the connection 1003 between the hand held optical reader 12 and the base unit 14. FIG. 14 shows the state of the BASETX/SCANRX line 1005 during the sequence of steps of an illustrative example that can be used to link a hand held optical reader 12 with a base unit 14 in accordance with the present invention.

Prior to time t0 1008a, the hand held optical reader 12 is not in the base unit 14. During this time, Pin 2 1005b of the base unit is at a high voltage state (logical 1) that is monitored by a general purpose input 1011 of the central processing circuitry 28 of the base unit 14.

At step 300 (time t0 1008a), the hand held optical reader 12 is placed in the base unit 14, creating the connection 1003 between the connector 1003a of the optical reader 12 and the connector 1003b of the base unit 14, and initiating the linking process. The presence of the hand held optical reader 12 in the base unit 14 causes the BASETX/SCANRX line 1005 to be pulled to a low voltage state (logical 0) by resistors R3 1017 and R4 1019. The values of resistors R2 1016 (for example, 100 K ohms), R3 1017 (for example, 470 ohms), and R4 1019 (for example, 1 K ohms), which form a voltage/resistor divider circuit, are chosen to result in a high voltage state (logical 1) for the BASETX/SCANRX line 1005 when the hand held optical reader 12 is not placed in the base unit 14 and a low voltage state (logical 0) when the hand held optical reader 12 is initially placed in the base unit 14.

At time step 302 (t1 1008b), the base unit's 14 central processing circuitry 28 senses that the BASETX/SCANRX line 1005 is low, i.e., senses the presence of the hand held optical reader 12 in the base unit 14, by monitoring the general purpose input 1011 and causes general purpose output 1010 of the central processing circuitry 28 to drive and turn on FET Q1 1014 through an inverter 1012 that forces the BASETX/SCANRX line 1005 back to a high voltage state. Once again, the values of resistors R3 1017 and R4 1019 are chosen to result in a high voltage state (logical 0) for the BASETX/SCANRX line 1005 when the FET Q1 1014 is driven and turned on. With the BASETX/SCANRX line 1005 high, the hand held optical reader's 12 control circuitry 16, which includes circuitry for power management, forces the optical reader 12 to be powered up if in a dormant state. From time t1 1008b to time t2 1008c, the base unit 14 waits approximately 1 second to ensure that the hand held optical reader 12 has time to perform a boot up if dormant.

At time t2 1008c, the base unit 14 stops driving and turns off FET Q1 1014, causing resistors R3 1017 and R4 1019 to pull the BASETX/SCANRX line 1005 to a low voltage state. The time delay between t2 1008c and t3 1008d is sufficient to place the hand held optical reader's 12 Universal Asynchronous Receiver/Transmitter (UART) device 1022 in a state that simulates the existence of a start bit by the steady high voltage output of the inverter 1021.

At step 304 (time t3 1008d), the base unit's 14 central processing circuitry 28 sends the address of the base unit's 14 wireless transceiver 32, along with other control information, from its general purpose output 1010 to the UART device 1022 of the hand held optical reader 12. In an embodiment of the present invention in which the Bluetooth wireless communication protocol is used, each hand held optical reader 12 and each base unit 14 is assigned a unique identifier or address. Although an embodiment using Bluetooth technology is described, it should be noted that IEEE 802.11b, Zig-Bee, or other standardized or proprietary RF technology could also be used in the present invention. In order for the hand held optical reader 12 to begin communicating wirelessly with the base unit 14, it must receive the base unit's 14 unique Bluetooth address. With the hand held optical reader 12 placed in the base unit 14, the base unit 14 can transmit its address to the optical reader 12 via the BASETX/SCANRX line 1005 of the connection 1003 using RS232 ASCII NRZ format at 1200 baud, N, 8, 1. The format of this transmission could be, for example, "[SYN]M[CR]BT_ADRxxxxxxxxxxxx," where "xxxxxxxxxxxx" is the address of the base unit 14 and where each character is a hexadecimal character. At time t4 1008e, the base unit 14 stops driving and turns off FET Q1 1014 again, causing resistors R3 1017 and R4 1019 to pull the BASETX/SCANRX line 1005 to a low voltage state. The UART device 1022, which is part of the hand held optical reader's 12 central processing circuitry 18, finishes receiving the Bluetooth address of the base unit 14 at time t4 1008e and transfers that address to memory 19. Once the hand held optical reader 12 has received the base unit's 14 address, the optical reader 12 need no longer be physically coupled with the base unit 14 since the remainder of linking communications take place wirelessly.

At step 305, the hand held optical reader 12 determines whether it is presently configured to link with a base unit 14. As will be described in greater detail below, the hand held optical reader 12 can be configured to operate in a plurality of user-selectable modes for linking a wireless hand held optical reader with either a base unit 12 or other wireless device. If the hand held optical reader 12 is configured in its "reader-base linking mode," the user is required to temporarily physically couple the optical reader and base unit together in order to initiate the linking process, and the optical reader 12 can only be linked with devices that can be physically coupled with the optical reader 12 to form a physical electrical connection 1003. For other applications where the wireless hand held optical reader 12 is to be linked with a device that cannot necessarily be physically coupled with the optical reader 12, the optical reader 12 can be configured in a "reader-free linking mode" where the linking of the two wireless devices is accomplished without a physical connection. Referring to FIGS. 9a and 9b, the hand held optical reader 12 may be regarded as having various processing circuits (modules), including reader linking mode circuit 400, that can be provided by appropriately programming central processing circuitry 18 with a program stored in memory 19 to monitor and control the optical reader's connector 1003a and its wireless transceiver 22 in accordance with the method of linking described in the flow diagrams of FIGS. 15a and 15b. Based on the results of this monitoring and control, the reader linking mode circuit 400 can then configure the hand held optical reader 12 to operate in "reader-base linking mode" or "reader-free linking mode."

At step 305, if the hand held optical reader is configured in "reader-base linking mode," the linking process continues. If it is not, at step 306, the hand held optical reader 12 is reconfigured to operate in "reader-base linking mode" using the control information sent by the base unit 14.

At step 307, the central processing circuitry 18 of the hand held optical reader 12 then compares the received base unit 14 address with the base unit 14 address, if any, already stored in memory 19. If the addresses are the same, there is no need to link the hand held optical reader 12 with the base unit 14 and the process is complete.

If there is no existing base unit 14 address or the stored address is different than the newly received address, at step 308, the wireless transceiver 22 of the hand held optical reader 12 assumes a Bluetooth Master role and goes into Page Mode while the wireless transceiver 32 of the base unit 14 assumes a Bluetooth Slave role and goes into Page Scan Mode. The hand held optical reader 12 transmits a wireless signal addressed to the base unit 14. The wireless signal includes information about the hand held optical reader 12 that allows the base unit 14 to communicate with the hand held optical reader 12. For example, when a Bluetooth wireless system is used, the information contained in the wireless signal will include the unique address of the wireless transceiver 22 of the hand held optical reader 12 as well as a request to link.

Figure 10B:
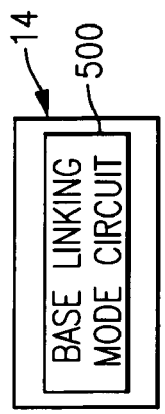
FIG. 10b is a schematic block diagram illustrating the incorporation of a base linking mode circuit into the base unit according to the present invention.

After the base unit 14 receives the wireless signal from the hand held optical reader including the optical reader's 12 wireless address and a request the link, the base unit 12 determines whether to reject or accept the request to link. This determination is based upon which linking mode the base unit 12 is configured to operate in. According to one embodiment of the present invention, the base unit 14 is capable of operating in at least three different linking modes, either where only one optical reader 12 can be linked with a base unit 14 ("base-single reader mode (locked)" or "base-single reader mode (open)") or where more than one optical reader 12 can be linked with a base unit 14 ("base-multiple reader mode") at any one time. The base unit 14 can be programmed to function in any of these modes by using an already linked hand held optical reader 12 to scan an appropriate bar code label associated with each mode to configure the base unit 14 to operate in that mode. Referring to FIGS. 10a and 10b, the base unit 14 may be regarded as having various processing circuits (modules), including base linking mode circuit 500, that can be provided by appropriately programming central processing circuitry 28 with a program stored in memory 29 to monitor and control the base unit's 14 connector 1003b and its wireless transceiver 32 in accordance with the method of linking described in the flow diagrams of FIGS. 15a and 15b. Based on the results of this monitoring and control, the reader linking mode circuit 500 can then configure the base unit 14 to operate in "base-single reader mode (locked)," "base-single reader mode (open)," or "base-multiple reader mode"

For example, to operate the base unit 14 to communicate only with a single hand held optical reader 12, a user has two options: "base-single reader mode (locked)" and "base-single reader mode (open)". In "base-single reader mode (locked)," once a hand held optical reader 12 is linked with a base unit 14, other optical readers 12 are blocked from linking to the base unit 14 if they are inadvertently placed into the base unit 14. To operate in "base-single reader mode (locked)," an already linked optical reader 12 scans a "base-single reader mode (locked)" bar code label. The information contained in the bar code label causes the hand held optical reader 12's linking mode switching circuit 400 to be or remain configured in the default "reader-base linking mode," whereby the optical reader 12 can only be linked with devices that can be physically coupled with the optical reader 12 to form a physical electrical connection 1003. The information contained in the bar code label is also transmitted to the base unit 14, configuring the base unit's linking mode switching circuit 500 so that other optical readers 12 may not link with the base unit 12. Returning to the flow diagrams of FIGS. 15a and 15b, at step 310, the base unit 14 determines whether it is operating in "base-single reader mode (locked)." If it is, at step 312, the base unit 14 rejects the hand held optical reader's 12 request to link and transmits the rejection to the optical reader 12, terminating the linking process. When the hand held optical reader 12 receives this rejection, it removes the wireless address associated with that base unit 14 from its memory.

If the base unit 14 is not in "base-single reader mode (locked)," at step 314, it next determines if it is in "base-single reader mode (open)." In "base-single reader mode (open)," when a hand held optical reader 12 is placed in the base unit 14, the existing link established in the base unit 14 is removed and a new link is established. To operate in "base-single reader mode (open)," the already linked optical reader 12 scans the "base-single reader mode (open)" bar code label. The information contained in the bar code label causes the hand held optical reader's linking mode switching circuit 400 to be or remain configured in the default "reader-base linking mode," whereby the optical reader 12 can only be linked with devices that can be physically coupled with the optical reader 12 to form a physical electrical connection 1003. The information contained in the bar code label is also transmitted to the base unit 14, configuring the base unit's 14 linking mode switching circuit 500 so that the existing link is removed when establishing the new link. Returning to the flow diagrams of FIGS. 15a and 15b, if at step 314, the base unit 14 is in "base-single reader mode (open)," at step 316, the base unit 14 transmits a wireless signal to the previously linked optical reader 12 to terminate the existing link. At step 318, the base unit 14 then transmits a wireless signal to the new hand held optical reader 12, including an acceptance of the request to link as well as any additional information to complete the linking process. At step 320, the hand held optical reader 12 and base unit 14 complete the linking process using wireless communication.

If the base unit 14 is not in "base-single reader mode (open)" and, as already has been determined at step 308, is not in "base-single reader mode (locked)," by default, the base unit 14 is in "base-multiple reader mode." To cause the base unit 14 operate in "base-multiple reader mode," the linked optical reader 12 scans a "base-multiple reader mode" bar code label. The information contained in the bar code label causes the hand held optical reader 12's linking mode switching circuit 400 to be or remain configured in the default "reader-base linking mode," whereby the optical reader 12 can only be linked with devices that can be physically coupled with the optical reader 12 to form a physical electrical connection 1003. The information contained in the bar code label is also transmitted to the base unit 14, configuring the base unit's 14 linking mode switching circuit 500 to allow multiple optical readers 12 to be linked with the base unit 14. A predetermined limit can be placed on the number of hand held optical readers 12 that can be linked with a base unit. This limit may be a function of the number of hand held optical reader 12 wireless transceivers 22 that the base unit 14 wireless transceiver 32 can communicate with (for example, seven). Once that limit is reached, the base unit 14 will not allow linking of another hand held optical reader 12 until one of the optical readers 12 is unlinked. A hand held optical reader 12 can be unlinked from the base unit 14 by scanning an "unlink" bar code label, causing the base unit 14 to both communicate the unlinking to the optical reader 12, which will then delete the address of the base unit 14, and then delete the information associated with that particular optical reader 12. It should be pointed out that in "base-multiple reader mode," while the base unit 14 can accommodate multiple hand held optical readers 12, each optical reader 12 only communicates with a single base unit 14. Returning to the flow diagrams of FIGS. 15a and 15b, if the base unit 14 is in "base-multiple reader mode," at step 324, the base unit 14 determines whether the maximum number of optical readers 12 is already linked to the base unit 14. If the maximum number of linked optical readers 12 has already been reached, at step 326, the base unit 14 rejects the hand held optical reader's 12 request to link and transmits the rejection to the optical reader 12, terminating the linking process. When the hand held optical reader 12 receives this rejection, it removes the wireless address associated with that base unit 14 from its memory. If the maximum number of optical readers 12 has not been reached, at step 328, the base unit 14 then transmits a wireless signal to the new hand held optical reader 12, including an acceptance of the request to link as well as any additional information to complete the linking process. At step 330, the hand held optical reader 12 and base unit 14 complete the linking process using wireless communication.

In the preferred embodiment using Bluetooth communications, after the initial linking is complete, the wireless transceiver 22 of the hand held optical reader, still in the Bluetooth Master role, initiates another linking process to switch roles with the wireless transceiver 32 of the base unit, which can then assume the Bluetooth Master role. The hand held optical reader 12 and/or base unit 14 can be programmed to emit an audio signal or beep when the linking process is complete by momentarily activating a speaker.

In the linking method described above, the hand held optical reader is configured in a default "reader-base linking mode," whereby its mode switching circuit 400 configures the optical reader 12 to only link with base units 14 or other devices that can be physically coupled with the optical reader's connector 1003a to form a physical electrical connection between the devices to enable the linking process to take place. In addition to linking with a base unit 14 at a point of sale 150 in its default "reader-base linking mode," the hand held optical reader 12 of the preferred embodiment can also communicate directly with other devices that include a wireless transceiver capable of Bluetooth communication or are coupled with a USB dongle utilizing the Bluetooth communications standard. As mentioned above, examples of these other host devices include a personal digital assistant (PDA), a portable data terminal (PDT), or similar device. For example, as shown in FIG. 1, a hand held optical reader 12 could be used as an input device by a retail store manager with a PDT 170 containing information about various products. As the optical reader 12 scans the bar codes associated with each product, the PDT 170 receives this bar code and displays the information associated with the product. In order to enable this communication, however, the hand held optical reader 12 and PDT 170, or other device, must be linked. In the likely event that PDT 170 or other device does not have a connector to mate with the connector 1003a of the hand held optical reader 12 to initiate the linking process described above (i.e., transferring the address to the optical reader 14 through the connection 1003), a secondary linking process is required.

To enable this secondary linking process, the hand held optical reader 12 must be placed in "reader-free linking mode." In "reader-free linking mode," the hand held optical reader 12 provides indication to other host devices that it is available for linking. In order to cause the optical reader's 12 reader mode linking circuit 400 to configure the reader 12 to operate in "reader-free linking mode," similar to other configuration procedures discussed above, the optical reader 12 can scan an "reader-free linking mode" bar code label. The information contained in the bar code label causes the reader mode linking circuit 400 to configure the optical reader 12 to begin operating as a Bluetooth Slave in Broadcast mode. Alternatively, the hand held optical reader 12 can be placed into "reader-free linking mode" in a variety of other ways. As shown in FIG. 9a, the optical reader's 12 user interface/accessory bus 17 may include a number of user interfaces that would allow a user to configure the optical reader to operate in "reader-free linking mode" using a keypad 17c, a display 17d, a touch screen 17e, or any combination thereof. For example, the optical reader 12 could provide a graphical user interface (GUI) to allow the user to switch between different reader linking modes by selecting appropriate icons.

Once the optical reader 12 of the preferred embodiment has been configured to operate in "reader-free linking mode," it begins to transmit messages, including the name of the optical reader 12 as well as the address of its wireless transceiver 22, to inform any nearby Bluetooth devices that it is available for linking. The other device, such as a PDT 170, in the broadcast area and set in Discovery Mode will be informed of the hand held optical reader 12. Acting as a Bluetooth Master, the PDT 170 can initiate the linking process of the wireless transceivers by communicating its address to the optical reader 12 and following the process described above. After the hand held optical reader 12 and the PDT 170 have been linked, information scanned by the optical reader 12 will be transmitted to the other device. When the user no longer wishes to operate the optical reader 12 in "reader-free linking mode," that user can reconfigure the reader 12 to operate in "reader-base linking mode" using any of the methods described above, including scanning appropriate bar code labels or using a graphical user interface. In addition, the user can simply place the hand held optical reader into a base unit 14 to initiate the linking process as described above and shown in the flow diagrams of FIGS. 15a and 15b. At step 305 of the process, if the optical reader 12 is in "reader-free linking mode," at step 306, the reader 12 will be reconfigured into "reader-base linking mode."

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A retail store network, said network comprising:
    a hand held bar code reader for reading a bar code symbol of an item and generating therefrom a decoded out bar code data message, said hand held bar code reader having a first connector and a first wireless transceiver;
    a base unit for receiving said decoded out bar code data message from said hand held bar code reader, said base unit having a second connector and a second wireless transceiver;

a cash register for receiving said decoded out bar code data message from said base unit, said cash register coupled to said base unit;

a server for receiving said decoded out bar code data message from said cash register, said server coupled to said cash register and storing a price lookup table for correlating said decoded out bar code data message to price information;

wherein said network is configured so that said hand held bar code reader reads said bar code symbol and transmits said decoded out bar code data message using said first wireless transceiver, said base unit receives said decoded out bar code data message using said second wireless transceiver and transmits said decoded out bar code data message to said cash register, which sends said decoded out bar code data message to said server, which returns to said cash register price information correlated with said bar code data message; and wherein said network is configured so that said hand held bar code reader and said base unit have a linking mode in which a second address of said base unit is sent to said hand held bar code reader through said first and second connectors, and a first address of said hand held bar code reader and a request to link are sent to said base unit by way of wireless communication between said second wireless transceiver and said first wireless transceiver.

2. The retail store network of claim 1, wherein said sending of an address of said base unit to said hand held bar code reader through said first and second connectors is initiated when a portion of said hand held bar code reader is placed in contact with said base unit, forming an electrical connection between said first and second connectors.

3. The retail store network of claim 1, wherein said hand held bar code reader and said base unit each further include complementarily shaped housings allowing a portion of a handle of said hand held bar code reader to be inserted into and supported by a socket of said base unit.

4. The retail store network of claim 3, wherein said first connector is positioned toward a rear portion of said handle of said hand held bar code reader and said second connector is positioned toward a rear portion of said socket of said base unit to result in optimum contact between said connectors produced from gravitational pull on the forward portion of said hand held bar code reader.

5. The retail store network of claim 1, wherein said bar code symbol is a linear symbol.

6. The retail store network of claim 1, wherein said bar code symbol is a two-dimensional symbol.

7. The retail store network of claim 1, wherein said first and second wireless transceivers communicate in accordance with the Bluetooth wireless communication standard.

8. The retail store network of claim 1, wherein said first address of said hand held bar code reader is the address of said first wireless transceiver and said second address of said base unit is the address of said second wireless transceiver.

9. A method of linking a hand held optical reader with a base unit comprising the steps of:

placing a portion of said hand held optical reader in contact with said base unit, forming an electrical connection between a first connector of said hand held optical reader and a second connector of said base unit;

sensing that said hand held optical reader is in contact with said base unit;

transmitting a second address of said base unit to said hand held optical reader through said electrical connection between said first connector and said second connector;

transmitting a first address of said hand held optical reader and a request to link to said base unit wirelessly between a first transceiver of said hand held optical reader and a second transceiver of said base unit; and transmitting acceptance of said request to link to said hand held optical reader wirelessly between said second transceiver of said base unit and said first transceiver of said hand held optical reader.

10. The method of claim 9, wherein said first address of said hand held optical reader is the address of said first wireless transceiver and said second address of said base unit is the address of said second wireless transceiver.

11. The method of claim 9, wherein said first and second wireless transceivers communicate in accordance with the Bluetooth wireless communication standard.

12. The method of claim 9, further comprising the step of determining whether said base unit is in a linking mode where said hand held optical reader's request to link will be accepted or rejected prior to transmitting said acceptance of said request to link.

13. The method of claim 9, further comprising the step of emitting an audio signal at the completion of said linking method.

14. A hand held bar code reader system comprising:

a hand held bar code reader having an imaging module, a bar code decoding circuit coupled to said imaging module, a hand held housing supporting said imaging module, a trigger for actuating said hand held bar code reader to read bar codes, and a first wireless transceiver configured to transmit and receive data packets in accordance with a wireless data communication standard;

a base unit having a housing including a socket for receiving said hand held housing, a base linking mode circuit, said base linking mode circuit facilitating linking between said hand held bar code reader and said base unit, and a second wireless transceiver configured to transmit and receive data packets in accordance with said wireless data communication standard;

wherein said hand held bar code reader can be configured to operate in a reader-base linking mode in which said hand held bar code reader is capable of linking only with said base unit having said base linking mode circuit and configured to send data packets in accordance with said wireless data communication standard, but incapable of linking with any devices that are devoid of said base linking mode circuit; wherein said hand held bar code reader can be further configured to operate in a reader-free linking mode in which said hand held bar code reader is capable of linking with devices that are configured to send data packets in accordance with said wireless data communication standard, even if said devices are devoid of said base linking mode circuit;

a reader linking mode circuit incorporated in said hand held bar code reader enabling an operator to select between said reader-base linking mode and reader-free linking mode.

15. The hand held bar code reader system of claim 14, wherein said selection between said reader-base linking mode and reader-free linking mode is performed by scanning a bar code symbol associated with each mode.

16. The hand held bar code reader system of claim 14, wherein said selection between said reader-base linking mode and reader-free linking mode is performed by entering an appropriate command into a keypad of said hand held bar code reader.

17. The hand held bar code reader system of claim 14, wherein said selection between said reader-base linking mode and reader-free linking mode is performed by making a selection on a graphical user interface of said hand held bar code reader.

18. The hand held bar code reader system of claim 14, wherein to initiate said linking, said reader-base linking mode requires the operator to place a portion of said hand held bar coder reader in contact with said base unit, forming an electrical connection between a first connector of said hand held bar code reader and a second connector of said base unit.

19. The hand held bar code reader system of claim 14, wherein said wireless data communication standard is the Bluetooth wireless communication standard.

20. The hand held bar code reader system of claim 14, wherein said base linking mode circuit determines whether said base unit is in a linking mode where said hand held bar code reader can link with said base unit.

21. A system comprising:
- a hand held bar code reading apparatus capable of reading bar code symbols, the hand held bar code reading apparatus having a first wireless transceiver, and a first wireless communication address;
- a base unit, said base unit having a second wireless transceiver, and a second wireless communication address;
- wherein said system is configured so that said second wireless communication address of said base unit wireless transceiver is transmitted to said hand held bar code reading apparatus conditionally on the condition that said hand held bar code reading apparatus is placed in physical contact with said base unit; and
- wherein said system is configured so that after said second wireless communication address is transmitted to said hand held bar code reading apparatus, said hand held bar code reading apparatus can communicate wirelessly with said base unit utilizing said second wireless communication address.

22. The system of claim 21, wherein said base unit is configured so that said base unit can support and hold said hand held bar code reading apparatus.

23. The system of claim 21, wherein said base unit includes a socket and wherein said system is configured so that said hand held bar code reading apparatus can be temporarily docked in said socket.

24. The system of claim 21, wherein said hand held bar code reading apparatus and said base unit include respective electrical connectors, and wherein said system is configured so that said respective electrical connectors can be brought into contact with one another.

25. The system of claim 21, wherein said hand held bar code reading apparatus and said base unit include respective electrical connectors, wherein said system is configured so that said respective electrical connectors can be brought into contact with one another, and wherein said system is configured so that said second wireless communication address is transmitted to said hand held bar code reading apparatus through said respective connectors when said respective electrical connectors are brought into contact with one another.

* * * * *